(12) United States Patent
Fujihara et al.

(10) Patent No.: US 8,880,409 B2
(45) Date of Patent: Nov. 4, 2014

(54) SYSTEM AND METHOD FOR AUTOMATIC TEMPORAL ALIGNMENT BETWEEN MUSIC AUDIO SIGNAL AND LYRICS

(75) Inventors: Hiromasa Fujihara, Tsukuba (JP); Masataka Goto, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1127 days.

(21) Appl. No.: 12/866,159

(22) PCT Filed: Feb. 5, 2009

(86) PCT No.: PCT/JP2009/051970
§ 371 (c)(1),
(2), (4) Date: Nov. 19, 2010

(87) PCT Pub. No.: WO2009/099146
PCT Pub. Date: Aug. 13, 2009

(65) Prior Publication Data
US 2011/0054910 A1 Mar. 3, 2011

(30) Foreign Application Priority Data
Feb. 5, 2008 (JP) ................................. 2008-025703

(51) Int. Cl.
*G10L 21/00* (2013.01)
*G10L 15/26* (2006.01)
*G10L 25/90* (2013.01)

(52) U.S. Cl.
CPC ............... *G10L 15/265* (2013.01); *G10L 25/90* (2013.01)
USPC .......................................... 704/278; 704/214

(58) Field of Classification Search
CPC ......... G10L 25/78; G10L 25/90; G10L 25/93; G10L 13/033; G10L 15/256
USPC .................................................. 704/278, 214
See application file for complete search history.

(56) References Cited

U.S. PATENT DOCUMENTS

| | | | |
|---|---|---|---|
| 6,836,761 B1 | 12/2004 | Kawashima et al. | |
| 7,464,034 B2 | 12/2008 | Kawashima et al. | |
| 8,131,545 B1 * | 3/2012 | Moreno et al. | ................. 704/235 |

FOREIGN PATENT DOCUMENTS

| | | |
|---|---|---|
| JP | 2001-117582 A | 4/2001 |
| JP | 2001-117598 A | 4/2001 |

(Continued)

OTHER PUBLICATIONS

Fujihara et al, "Automatic Synchronization Between Lyrics and Music CD Recordings Based on Viterbi Alignment of Segregated Vocal Signals," Dec. 2006, Eighth IEEE International Symposium on Multimedia, pp. 257-264.*

(Continued)

*Primary Examiner* — David Hudspeth
*Assistant Examiner* — Oluwadamilola M. Ogunbiyi
(74) *Attorney, Agent, or Firm* — Rankin, Hill & Clark LLP

(57) ABSTRACT

A system provided herein may perform automatic temporal alignment between music audio signal and lyrics with higher accuracy than ever. A non-fricative section extracting 4 extracts non-fricative sound sections, where no fricative sounds exist, from the music audio signal. An alignment portion 17 includes a phone model 15 for singing voice capable of estimating phonemes corresponding to temporal-alignment features. The alignment portion 17 performs an alignment operation using as inputs temporal-alignment features obtained from a temporal-alignment feature extracting portion 11, information on vocal and non-vocal sections obtained from a vocal section estimating portion 9, and a phoneme network SN on conditions that no phonemes exist at least in non-vocal sections and that no fricative phonemes exist in non-fricative sound sections.

10 Claims, 22 Drawing Sheets

(56) References Cited

FOREIGN PATENT DOCUMENTS

| JP | 2001-125562 | 5/2001 |
| JP | 2008-15388 A | 1/2008 |

OTHER PUBLICATIONS

Wong et al, "Automatic Lyrics Alignment for Cantonese Popular Music," Mar. 2007, Journal of Multimedia Systems, vol. 12, Issue 4-5, pp. 307-323.*

Hirokazu Kameoka et al. "Selective Amplifier of Periodic and Nonperiodic Components in Concurrent Audio Signals with Spectral Control Envelopes", Study Report, Information Processing Society of Japan, 2006-MUS-66-13, pp. 77-84, Sep. 2006.

Hiromasa Fujihara et al. "VocalFinder: A Music Information Retrieval System Based on Vocal Timbre Similarity", Information Processing Society of Japan Kenkyu Hokoku, Aug. 1, 2007, vol. 2007, No. 81, pp. 27-32.

Hiromasa Fujihara et al. "A Singer Identification Method for Musical Pieces on the Basis of Accompaniment Sound Reduction and Reliable Frame Selection", Journal vol. 47, No. 6 of Information Processing Society of Japan, Jun. 2006.

Hiromasa Fujihara, et al. "Automatic Synchronization Between Musical Audio Signals and their Lyrics: Vocal Separation and Viterbi Alignment of Vowel Phonemes", Study Report 2006-MUS-66, pp. 37-44 of Information Processing Society of Japan, Aug. 8, 2006.

Masataka Goto, "FO Estimation of Melody and Bass Lines in Musical Audio Signals", Journal of the Institute of Electronics, Information and Communication Engineers, D-II, vol. J84-D-II, No. 1, pp. 12-22, Jan. 2001.

* cited by examiner

| Sampling | 16kHz, 16bit |
|---|---|
| Window Function | Hamming Window |
| Frame Width | 25ms |
| Frame Shift | 10ms |
| Sampling | 12th order (12th order MFCC) 12th order (12th order ΔMFCC) ΔPower |

Fig. 24

| Songs | Singer's Gender | (i) Comparison | (ii) Non-Fricative Sound | (iii) Filler | (iv) Novel Feature Vector | (v) Proposed Technique |
|---|---|---|---|---|---|---|
| 12 | Male | 95.7 | 95.1 | 96.3 | 97.8 | 95.7 |
| 27 | Male | 87.4 | 87.6 | 86.3 | 90.2 | 91.2 |
| 32 | Male | 66.4 | 69.6 | 70.2 | 81.3 | 71.7 |
| 37 | Male | 83.7 | 85.9 | 89.5 | 89.5 | 89.5 |
| 39 | Male | 93.6 | 93.2 | 92.4 | 93.9 | 93.3 |
| 7 | Female | 62.8 | 62.5 | 67.4 | 79.9 | 70.0 |
| 13 | Female | 63.6 | 70.4 | 67.2 | 46.0 | 68.0 |
| 20 | Female | 93.3 | 93.3 | 93.1 | 92.7 | 94.0 |
| 65 | Female | 73.7 | 85.4 | 91.6 | 91.2 | 92.0 |
| 75 | Female | 90.6 | 88.2 | 90.3 | 85.9 | 87.8 |
| Average | | 81.1 | 83.1 | 84.4 | 84.8 | 85.3 |

Note: the numbers in "Songs" column denote the ID numbers of songs registered in RWC-MDB-P-2001 Database.

SYSTEM AND METHOD FOR AUTOMATIC TEMPORAL ALIGNMENT BETWEEN MUSIC AUDIO SIGNAL AND LYRICS

TECHNICAL FIELD

The present invention relates to a system that automatically performs temporal alignment between music audio signals of a musical piece including vocals and accompaniment sounds, and lyrics and a method therefor as well as a computer program for use in the system.

BACKGROUND ART

Japanese Patent Application Publication No. 2001-117582 (JP2001-117582A) discloses a technique for aligning a sequence of phonemes for vocal or singing voice of a singing user (inputter) with a sequence of phonemes for vocal or singing voice of a particular singer using some aligning means in Karaoke equipment. However, JP2001-117582A does not disclose a technique for temporal alignment between music audio signals and lyrics.

Japanese Patent Application Publication No. 2001-125562 (JP2001-125562A) discloses a technique for extracting dominant sound audio signals from mixed sound audio signals including polyphonic sound mixture of vocals and accompaniment sounds by estimating the pitch of the most dominant sound including the vocal or singing voice at each point of time. This technique allows extraction of dominant sound audio signals with reduced accompaniment sounds from the music audio signals.

Further, a technique for reducing accompaniment sounds as is disclosed in JP2001-125562A is also disclosed in the academic paper titled "Singer identification based on accompaniment sound reduction and reliable frame selection" written by Hiromasa Fujihara, Hiroshi Okuno, Masataka Goto, et al. in the Journal Vol. 47, No. 6 of Information Processing Society of Japan, June 2006 (Reference 2). Reference 2 also discloses a technique for extracting vocal and non-vocal sections from dominant sound audio signals, using two Gaussian mixture models (GMM) that have learned vocal and non-vocal. The document additionally discloses that LPC-derived mel cepstral coefficients are used as vocal features.

The academic paper titled "Automatic synchronization between lyrics and music CD recordings based on Viterbi alignment of segregated vocal signals" written by Hiromasa Fujihara, Hiroshi Okuno, Masataka Goto, et al. in the study report 2006-MUS-66, pages 37-44 of Information Processing Society of Japan (Reference 2) discloses a system for temporal alignment between lyrics of a song and vocals extracted from music audio signals including vocals and accompaniment sounds. In the disclosed system, the most dominant sound at each point of time is segregated from the audio signal including accompaniment sounds based on the harmonic structure of the audio signal in order to locate the start time and end time of each phrase in the lyrics. This step is referred to as "accompaniment sound reduction". In many cases, the most dominant sound includes vocal vowels in a section called as a vocal section which includes the vocal. Then, a vocal section is extracted from the segregated audio signal. This section is referred to as "vocal section detection" or "vocal activity detection". Further, alignment between the lyrics and the segregated vocal is estimated by means of a forced alignment technique called as Viterbi alignment which is used in speech recognition, using a phone model for singing voice adapted for segregated vocals. The system focuses only on vowels and ignores consonants.

DISCLOSURE OF THE INVENTION

Technical Problem

The technique employed in the system shown in Reference 2 has been confirmed as being effective by evaluative experiments. However, the following three issues remain unsolved in this system: (1) consonants cannot accurately be aligned; (2) utterances not included in the lyrics such as singer's shouting are inadvertently aligned with some lyrics; and (3) vocal sections are not always detected accurately when the fundamental frequency F0 of the vocal is high.

An object of the present invention is to provide a system for automatic temporal alignment between music audio signal and lyrics and a method therefore as well as a computer program therefore, which solves all of the above-mentioned three issues.

Another object of the present invention is to provide a system for automatic temporal alignment between music audio signal and lyrics and a method therefore as well as a computer program therefore, which solves the above-mentioned first and second issues.

Still another object of the present invention is to provide a system for automatic temporal alignment between music audio signal and lyrics and a method therefore as well as a computer program therefore, which solves the above-mentioned first and third issues.

Yet another object of the present invention is to provide a system for automatic temporal alignment between music audio signal and lyrics and a method therefore as well as a computer program therefore, which solves anyone of the above-mentioned three issues.

Solution to Problem

A system for automatic temporal alignment between music audio signal and lyrics, which solves all of the above-mentioned three issues, may comprise a dominant-sound signal extracting portion, a vocal-section feature extracting portion, a non-fricative section extracting portion, a vocal section estimating portion, a temporal-alignment feature extracting portion, a phoneme network storing portion, and an alignment portion.

The dominant-sound signal extracting portion extracts a dominant sound audio signal of the most dominant sound including the vocal at each point of time (e.g. every 10 msec), from a music audio signal of a musical piece including vocals and accompaniment sounds. The technique used herein to extract the dominant sound audio signal is the same as those shown in JP2001-125562A and References 1 and 2.

The vocal-section feature extracting portion extracts vocal-section features available to estimate vocal sections which include the vocals and non-vocal sections which do not include the vocals, from the dominant sound audio signal at each point of time (e.g. every 10 msec or for every frame). The vocal-section features to be extracted are a fundamental frequency F0 of the vocal and normalized h-th order logarithmic powers of overtones obtained by normalizing respective logarithmic values for up to h-th order powers of frequency components of the fundamental frequency F0 where h is a positive integer. Preferably, a derivative $\Delta F0$ of the fundamental frequency F0 may also be extracted as the vocal-section feature.

The vocal section estimating portion estimates the vocal sections and the non-vocal sections based on the vocal-section features and outputs information on the vocal sections and the non-vocal sections.

The non-fricative section extracting portion extracts non-fricative sound sections, namely sections where no fricative sounds exist, from the music audio signals.

The temporal-alignment feature extracting portion extracts, from the dominant sound audio signal at each point of time, temporal-alignment features appropriate for temporal alignment between lyrics of the vocal and the dominant sound audio signal. Specifically, in an embodiment of the present invention, the 25th order features such as a resonance property of the phoneme may be extracted as temporal-alignment features.

The results extracted by the vocal-section feature extracting portion, the non-fricative section extracting portion, and the temporal-alignment feature extracting portion may be stored in respective storage portions provided in those portions. The extractions for at least one musical piece may be stored in those storage portions and then may later be used for subsequent processing.

The phoneme network storing portion usually stores a phoneme network including a plurality of phonemes and short pauses in connection with lyrics of a musical piece corresponding to music audio signals. According to the present invention, the short pauses located at a boundary of two phrases included in the lyrics are incorporated or included in a filler for absorbing all vowel phonemes. For example, such a phoneme network may be obtained by converting the lyrics into a sequence of phonemes, subsequently converting a phrase boundary into a filler, and then converting a word boundary into one short pause. Japanese lyrics may be converted into a sequence of phonemes including vowels only or vowels and consonants, short pauses, and fillers.

The alignment portion includes a phone model for singing voice which is capable of estimating phonemes corresponding to the temporal-alignment features based on the alignment-temporal features. The alignment portion performs temporal alignment between phonemes in the phoneme network and the dominant sound audio signals. Specifically, the alignment portion receives the temporal-alignment features outputted from the temporal-alignment feature extracting portion, the information on the vocal sections and the non-vocal sections, the information on the non-fricative sound sections, and the phoneme network. Then, the alignment portion uses the phone model for singing voice to perform the temporal alignment between the music audio signals and lyrics on conditions that no phonemes exist at least in the non-vocal sections and that no fricative sound phonemes exist in the non-fricative sound sections.

The first feature of the present invention is to use the fundamental frequency F0 of the vocal, normalized h-th order logarithmic powers of overtones obtained by normalizing respective logarithmic values for up to h-th order powers of frequency components of the fundamental frequency F0 where h is a positive integer, and preferably a derivative $\Delta F0$ of the fundamental frequency F0 as the vocal-section features available to estimate the vocal and non-vocal sections. As a result, the vocal sections may more accurately be detected than ever even if the fundamental frequency F0 of the vocal is high. The order of the h-th overtone, or the value of h, may appropriately be determined by experiments. Especially, according to the present invention, since two features, namely the fundamental frequency F0 of the vocal and the normalized h-th order logarithmic powers of overtones are used, the powers of overtones may directly be compared with each other without estimating spectral envelopes. Even if the fundamental frequency F0 of the vocal is high, vocal sections may accurately be detected regardless of the sound volume of the vocal or singing voice. According to the prior art such as the technique shown in Reference 2, features obtained from cepstrum or LPC analysis are used. When using these features, spectral envelopes are estimated. As a result, such a technique does not always work properly for high-pitched sounds having high fundamental frequency F0. In contrast therewith, the present invention uses the normalized h-th order logarithmic powers of overtones, thereby allowing the direct comparison between harmonic structures without estimating spectral envelopes. Further, when additionally using a derivative $\Delta F0$ of the fundamental frequency F0 as the vocal-section feature, variations in pitch specific to the vocal may be taken into consideration.

The second feature of the present invention is to regard a short pause located at a boundary between two adjacent phrases in the lyrics as a filler and to include such fillers in a sequence of phonemes for absorbing all the vowel phonemes. With this, utterances not included in the lyrics such as singer's shouting are absorbed in the fillers, thereby preventing the utterances from being aligned with the lyrics. Further, according to the present invention, the alignment portion performs the temporal alignment on conditions that no phonemes exist at least in the non-vocal sections. As a result, the temporal alignment between phonemes in the sequence of phonemes and the dominant sound audio signals at respective points of time may be performed in a condition that the effects of non-vocal sections are suppressed as much as possible.

The third feature of the present invention is to provide a non-fricative section extracting portion configured to extract sections, where no fricative sounds exist, from music audio signals and to establish a condition that no fricative sound phonemes exist in the non-fricative sound sections for the temporal alignment to be performed by the alignment portion. It is known that the simplest approach to utilizing information on consonants is to incorporate or include consonants in a phoneme network for the forced alignment. However, when utilizing the harmonic structure for accompaniment sound reduction as with the present invention, unvoiced consonants cannot be segregated. For this reason, such simplest approach has limits to improving the accuracy of alignment of unvoiced consonants. Then, the present invention employs another approach, that is, to directly estimate candidates of fricative sounds among unvoiced consonants based on input audio signals that have not been segregated yet, and to use the information on non-fricative sounds as a clue to the alignment. As a result, the present invention may automatically generate time-tagged lyric data or lyric data tagged with time information which are synchronized with music audio signals. Here, a focus is placed only upon non-fricative sounds since the duration of a fricative sound is generally longer than those of other unvoiced sounds and the fricative sounds can readily be detected. However, it is not so easy to detect a section where fricative sounds exist. This is because it is sometimes difficult to distinguish a consonant from a fricative sound. In contrast, it is relatively easy to extract a section where no fricative sounds exist. For this reason, the present invention aims at not allocating fricative sounds of the lyrics in non-fricative sound sections or nonexistence regions of fricative sounds where no fricative sounds exist, thereby improving the accuracy of alignment.

If only one of the first to third features of the present invention is implemented, higher accuracy may still be expected than conventional systems. A system employing only one of the above-mentioned three features of the present invention also falls with the scope of the present invention. In other words, a system with the first and third features, a system with the first and second features, a system with the second and third features, a system having only the first feature, a system having only the second feature, and a system having only the third feature all fall within the scope of the present invention.

The h-th order overtones used in the vocal-section feature extracting portion are arbitrary. Experiments indicate that the 12th order overtones are preferred. Therefore, the normalized h-th order logarithmic powers of overtones may preferably be normalized 12th order logarithmic powers of overtones.

The vocal-section feature extracting portion may be configured to extract the normalized h-th order logarithmic powers of overtones, for example, as follows: first, to extract up to h-th order powers of the frequency components, which are integral multiples of the fundamental frequency F0, from spectrums of the dominant sound audio signals at each point of time; next, to calculate logarithmic values for up to the h-th order powers of the frequency components and define calculated values as h-th order logarithmic powers of overtones; and then, to normalize the h-th order logarithmic powers of overtones so that the sum of all the logarithmic powers of overtones may be zero throughout the musical piece.

The non-fricative section extracting portion may be configured to extract non-fricative sound sections or nonexistence regions of fricative sounds where no fricative sounds exist, for example, as follows: first, to estimate a bottom envelope from a frequency spectrum of the music audio signal at each point of time; and then to extract, as the non-fricative sound section, sections where a ratio of a total logarithmic power in a high frequency band including frequency components, which are included in the fricative sound, among available bands of the estimated bottom envelope over a total logarithmic power in the available bands is less than a predetermined value. In other words, sections are extracted, in which a ratio of a total logarithmic power in a high frequency band over a total logarithmic power in available bands is less than predetermined value, where the high frequency band refer to a band which includes frequency components included in a fricative sound among available bands of the estimated bottom envelope. The term "available bands" used herein refers to a band range within which the feature of the fricative sound appears in the bottom envelope. This extraction method is based on the fact that a fricative sound includes more frequency components included in a high frequency band of the entire band of the bottom envelope than other sounds. The predetermined value varies among individual singers or singing persons, but has experimentally been identified as about 0.4.

The present invention may also be identified as a method for automatic temporal alignment between music audio signal and lyrics. The method may include the following steps. First, a dominant-sound signal extracting step or the step of extracting a dominant sound audio signal extracts a dominant sound audio signal of the most dominant sound including the vocal at each point of time, from the music audio signal of a musical piece including vocals and accompaniment sounds. A vocal-section feature extracting step or the step of extracting vocal-section features extracts vocal-section features available to estimate vocal sections which include the vocals and non-vocal sections which do not include the vocals, from the dominant sound audio signal at each point of time. A non-fricative sound section extracting step or the step of extracting non-fricative sound sections extracts non-fricative sound sections or nonexistence regions of fricative sounds where no fricative sounds exist, from the music audio signal.

A vocal section estimating step or the step of estimating the vocal section estimates the vocal sections and the non-vocal sections based on the vocal-section features and outputs information on the vocal sections and the non-vocal sections. A temporal-alignment feature extracting step or the step of extracting temporal-alignment features extracts temporal-alignment features appropriate for temporal alignment between lyrics of the vocal and the music audio signal, from the dominant sound audio signal at each point of time. A phoneme network storing step or the step of storing a phoneme network stores in a phoneme network storing portion a phoneme network including a plurality of phonemes and a plurality of short pauses in connection with lyrics of a musical piece corresponding to the music audio signal. An alignment step or the step of performing temporal alignment performs temporal alignment between phonemes in the phoneme network and the dominant sound audio signals by using a phone model for singing voice that is capable of estimating phonemes corresponding to the temporal-alignment features based on the temporal-alignment features. In the vocal-section feature extracting step, the vocal-section features to be extracted are a fundamental frequency F0 of the vocal and normalized h-th order logarithmic powers of overtones obtained by normalizing respective logarithmic values for up to h-th order powers of frequency components of the fundamental frequency F0 where h is a positive integer. Among the short pauses included in the phoneme network, the short pauses located at a boundary of two phrases included in the lyrics are incorporated or included in a filler for absorbing all vowel phonemes. In the alignment step, the temporal-alignment features, the information on the vocal section and the non-vocal section, the information on the non-fricative sound sections or nonexistence regions of fricative sounds, and the phoneme network are used as inputs. The temporal alignment is performed on conditions that no phonemes exist at least in the non-vocal sections and that no fricative sound phonemes exist in the non-fricative sound sections.

A computer program used to implement the method of the present invention in the system of the present invention may be configured to execute the steps of the above-mentioned method using a computer. The computer program may be stored in a computer-readable recording medium.

BRIEF DESCRIPTION OF DRAWINGS

FIG. 18 (B) shows that temporal alignment is completed between lyrics and the music audio signals of polyphonic sound mixture including accompaniment sounds by restoring the sequence of phonemes to the lyrics after the alignment has been performed.

FIG. 24 shows results of evaluative experiments.

BEST MODE FOR IMPLEMENTING THE INVENTION

Figure 1:
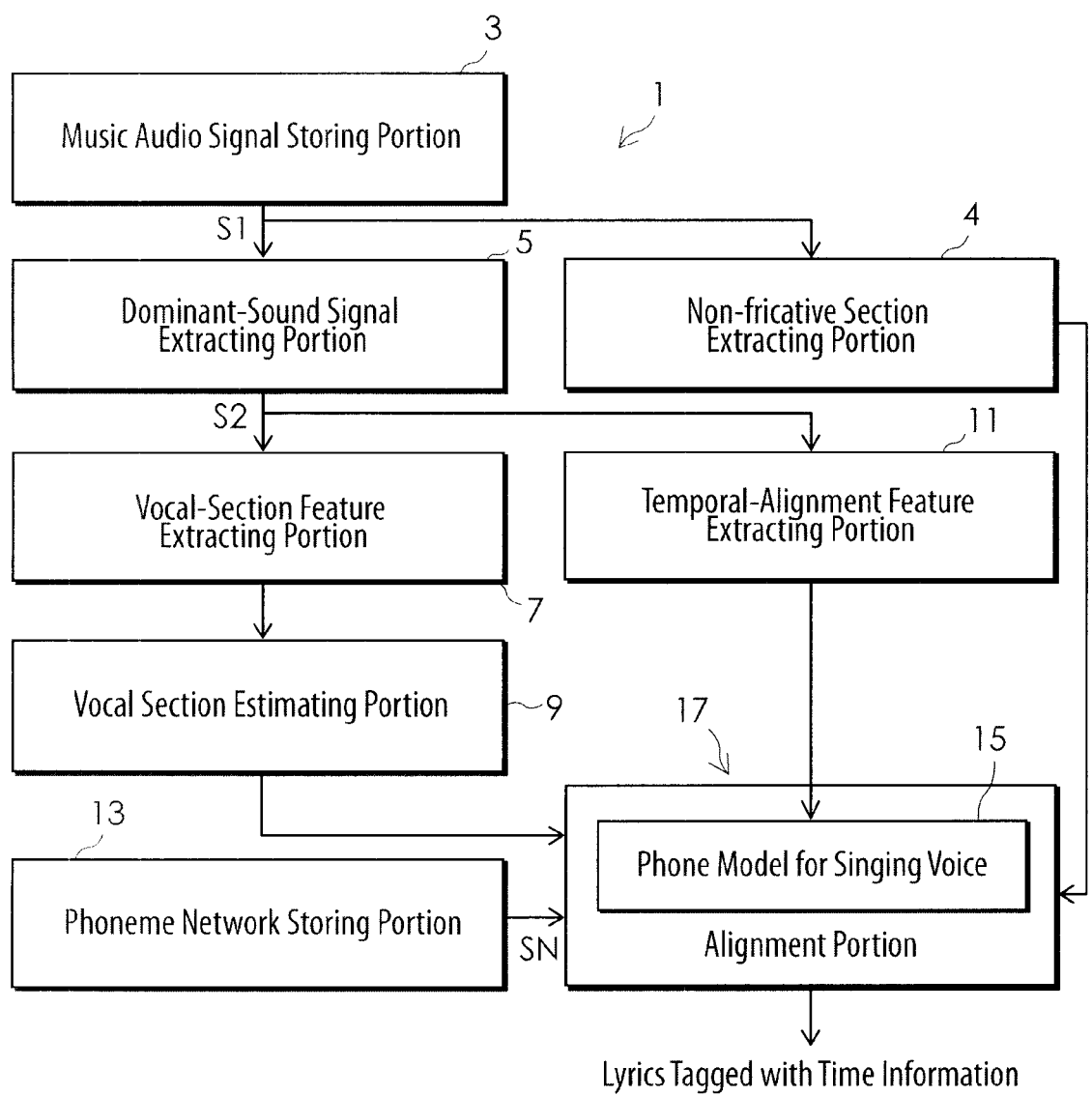
FIG. 1 is a block diagram illustrating a configuration of function implementing portions when implementing, using a computer, a system for automatic temporal alignment between music audio signal and lyrics according to the present invention.
Figure 2:
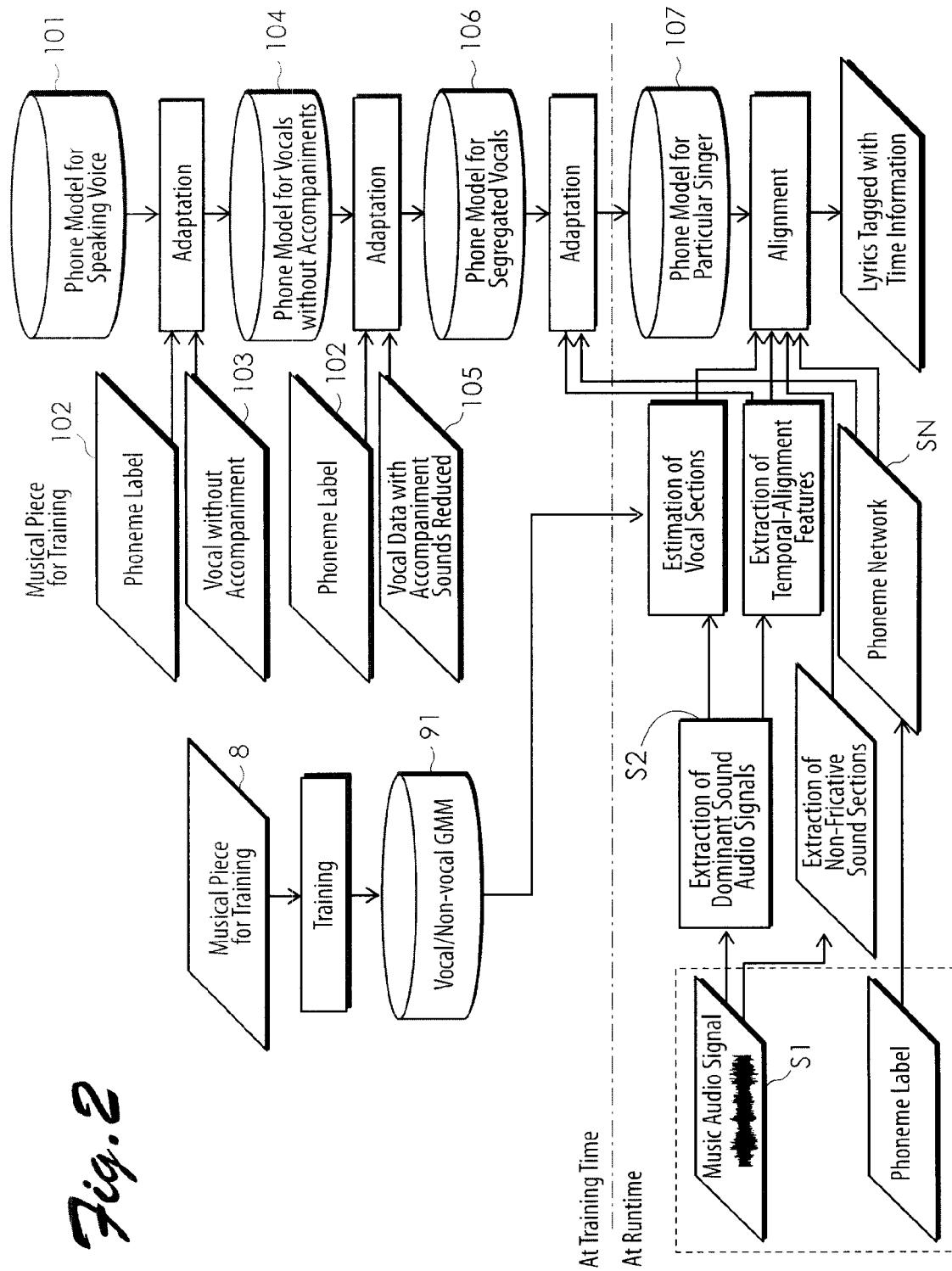
FIG. 2 is a flowchart showing the steps of implementing the system of FIG. 1 by running a computer program in the computer.

Now, an embodiment of the system for automatic temporal alignment between music audio signal and lyrics and a method therefor according to the present invention will be described in detail with reference to the accompanying drawings. FIG. 1 is a block diagram illustrating a configuration of function implementing portions when a system for automatic temporal alignment between music audio signal and lyrics according to the present invention is embodied in a computer. FIG. 2 is a flowchart showing the steps of implementing the system of FIG. 1 by running a computer program in the computer. The system 1 comprises a music audio signal storing portion 3, a non-fricative section extracting portion 4, a dominant-sound signal extracting portion 5, a vocal-section feature extracting portion 7, a vocal section estimating portion 9, a temporal-alignment feature extracting portion 11, a phoneme network storing portion 13, and an alignment portion 17 including a phone model 15 for singing voice.

The fundamental approach of the present invention is to perform the following three steps:
Step 1: Accompaniment sound reduction
Step 2: Vocal section detection (Vocal activity detection)
Step 3: Alignment (Temporal alignment)

To execute Step 1, the music audio signal storing portion 3 stores music audio signals of a plurality of musical pieces including vocals and accompaniment sounds, which are targets for temporal alignment. Following the steps shown in the flowchart of FIG. 3, the dominant-sound signal extracting portion 5 extracts a dominant sound audio signal S2 of the most dominant sound including vocal at each point of time (specifically, every 10 msec) from a music audio signal S1 of the musical piece including vocals and accompaniment sounds. In this embodiment, a dominant sound audio signal may be understood as a signal with reduced accompaniment sounds. The technique for extracting the dominant sound audio signal is the same as those disclosed in Japanese Patent Publication No. 2001-125562 (JP2001-125562A) and Reference 1. A typical waveform of the music audio signal S1 including vocals and accompaniment sounds is shown in FIG. 4A. A typical waveform of the dominant sound audio signal S2 with reduced accompaniment sounds, as outputted from the dominant-sound signal extracting portion 5, is shown in FIG. 4D. The dominant sound audio signal is extracted as follows.

Figure 3:
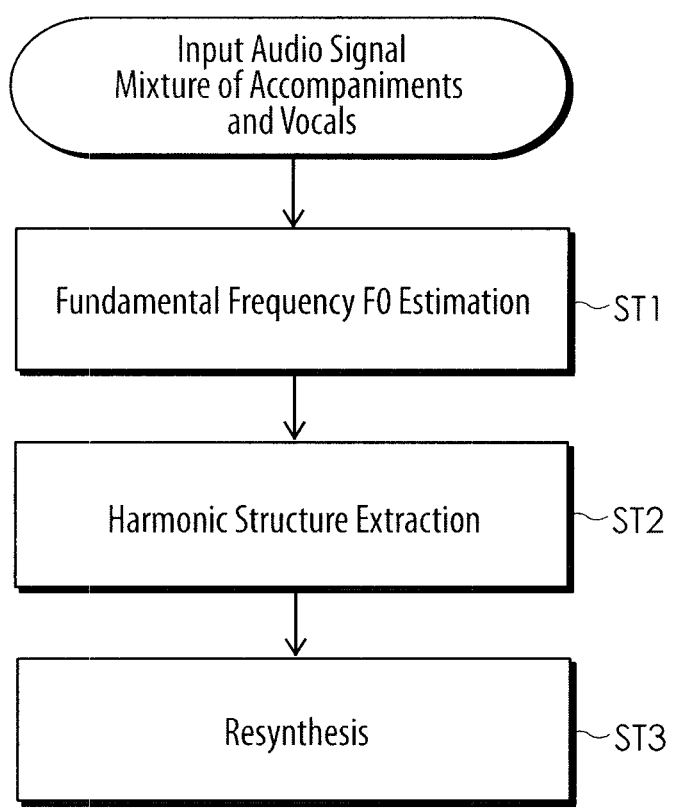
FIG. 3 is a flowchart showing the steps for accompaniment sound reduction.

First, it is necessary to obtain from the music audio signal a dominant sound audio signal with the influence of accompaniment sounds being reduced in order to extract vocal-section features and temporal-alignment features (phonologic features of a melody line or vocal) from a music audio signal including vocals and accompaniment sounds (polyphonic sound mixture or mixed sounds). Then, the dominant sound signal extracting portion 5 performs the following three steps as shown in FIG. 3.

ST1: To estimate the fundamental frequency F0 of the melody line (vocal).

ST2: To extract the harmonic structure of the melody line (vocal) based on the estimated fundamental frequency.

ST3: To resynthesize the extracted harmonic structure into a dominant sound audio signal.

The dominant sound audio signal may sometimes include a non-vocal audio signal such as an audio signal of accompaniment sound or no sounds in an interlude section. In this embodiment, therefore, the term "reduction", not the term "removal", is used for accompaniment sounds.

ST1: Fundamental Frequency F0 Estimation

Various techniques for estimating the fundamental frequency of the melody line (vocal) have been known. For example, as described in "F0 Estimation of Melody and Bass Lines in Musical Audio Signals" written by Masataka Goto, in the journal of the Institute of Electronics, Information and Communication Engineers, D-II, Vol. J84-D-II, No. 1, pp. 12-22, January 2001, PreFEst, a technique for estimation of predominant fundamental frequency F0, which does not assume the number of sound sources, may be used to estimate the fundamental frequency. PreFEst is known as a technique for estimating the fundamental frequency F0 of the melody and bass lines. Specifically, PreFEst estimates the fundamental frequency F0 of a dominant sound having the most dominant harmonic structure or the largest sound at each point of time within a limited frequency band. In the PreFEst technique, a probability model or distribution representing the shape of a harmonic structure is prepared for every pitch or fundamental frequency. Then, an input frequency component is modeled into a mixture distribution model (weighted mixture=weighted summation).

In a high-frequency or middle-frequency band or region, the melody line (vocal) tends to have the most dominant harmonic structure at each point of time. The fundamental frequency F0 of the melody line may be estimated by appropriately limiting the frequency band. PreFEst will now be briefly described below. Here, x stands for a frequency on the log-scale frequency axis, expressed in units of cents, and (t) for discrete time. Although a cent originally denotes a tone interval or relative pitch, it is used in the specification of the present invention as a unit of absolute pitch using $440 \times 2^{\{(3/12)-5\}}$ [Hz] as a reference, as shown below.

$$f_{cent} = 1200 \log_2 \frac{f_{Hz}}{440 \times 2^{\frac{3}{12}-5}}$$

Given the power spectrum $\Psi_p^{(t)}(x)$, a band-pass filter (BPF) is applied, which is designed to allow most of the frequency components of the melody line to pass therethrough. It is preferable to use a filter allowing frequency components of 4800 cents or more to pass therethrough. The filtered frequency components are represented by $BPF(x) \cdot \Psi_p^{(t)}(x)$ where $BPF(x)$ is a frequency response of the band-pass filter. Hereinafter, in order to enable probability processing, each of the band-pass filtered frequency components is represented as a probability density function (PDF) as follows:

$$p_\Psi^{(t)}(x) = \frac{BPF(x)\Psi_p^{(t)}(x)}{\int_{-\infty}^{\infty} BPF(x)\Psi_p^{(t)}(x)dx}$$

Then, it is assumed that the probability density function PDF of a frequency component has been generated from a weighted-mixture model of tone models for all the possible fundamental frequencies F0s. The weighted-mixture model is represented as:

$$p(x|\theta^{(t)}) = \int_{Fl}^{Fh} w^{(t)}(F) p(x|F) dF,$$

$$\theta^{(t)} = \{w^{(t)}(F) | Fl \le F \le Fh\}$$

In the above expression, $p(x|F)$ stands for a tone model of each F0, Fh for the upper limit of the possible or allowable F0 range, Fl for the lower limit of the possible or allowable F0 range, and $w^{(t)}(F)$ for a weight for the tone model which satisfies the following expression:

$$\int_{Fh}^{Fl} w^{(t)}(F) dF = 1$$

Figure 4:
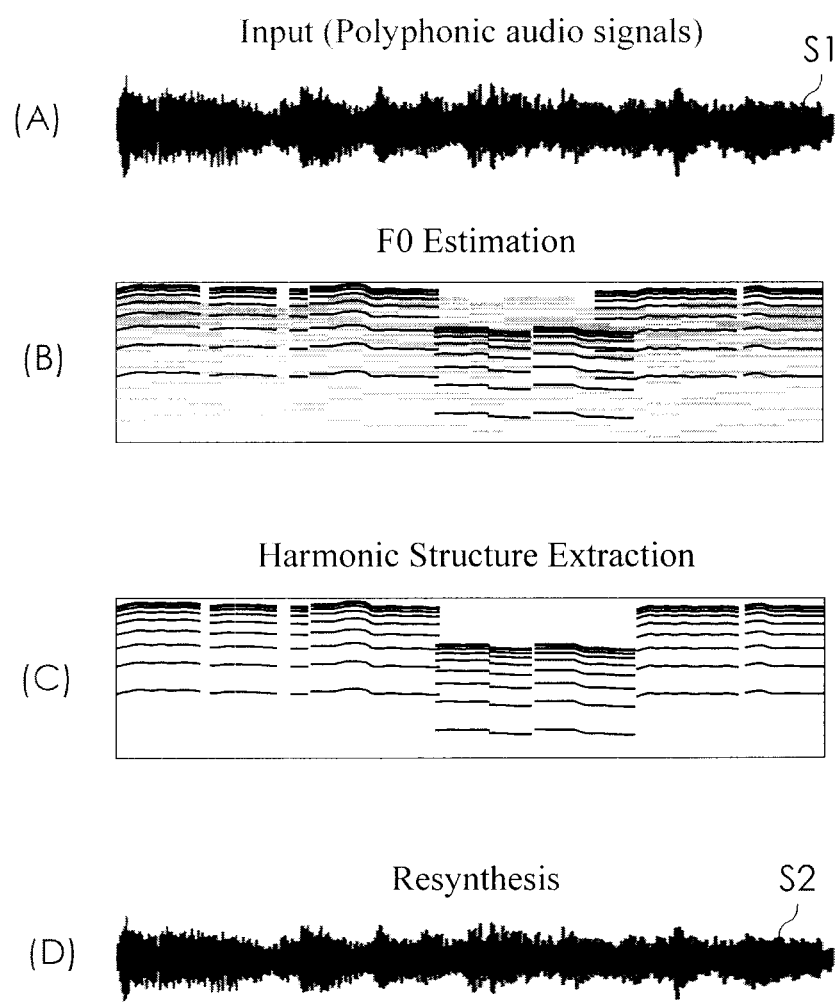
FIGS. 4(A) to 4(D) illustrate waveforms used to explain the process in which dominant sound audio signals is extracted from the music audio signals.

Here, a tone model is a probabilistic model representing a typical harmonic structure. Then, $w^{(t)}(F)$ is estimated using the EM (Expectation Maximization) algorithm, and the estimated $w^{(t)}(F)$ is interpreted as the probability density function (PDF) of the fundamental frequency F0. Finally, F0 estimation of the melody line (vocal) is accomplished by tracking a dominant peak trajectory of F0 from $w^{(t)}(F)$ using a multi-agent model. FIG. 4 illustrates F0 estimation thus obtained.

ST2: Harmonic Structure Extraction

Based on the estimated F0, the power of each harmonic component in the harmonic structure of the melody line is extracted. For each component, r cent error is allowed around the peak, and then a peak having the strongest power is extracted in the allowed range or region. The powers A and frequencies F of the l-th order overtones, where l=1, ... L, may be represented as:

$$F_l = \operatorname*{argmax}_F |S(F)| \left( lF \cdot \left(1 - 2^{\frac{r}{1200}}\right) \le F \le lF \cdot \left(1 + 2^{\frac{r}{1200}}\right) \right)$$

$$A_l = |S(F_l)|$$

In the above expression, S(F) denotes a spectrum, and a symbol with a bar (-) indicated above the letter F denotes a fundamental frequency F0 estimated by PreFEst. In the experiments carried out by the inventors; r was set to 20 and the harmonic structure was extracted. The results have been confirmed as described later. FIG. 4C shows a harmonic structure of each extracted fundamental frequency.

ST3: Resynthesis

The dominant audio signal of the most dominant sound including the vocal at each point of time is obtained by resynthesizing the extracted harmonic structure based on the a sinusoidal model. The frequency and amplitude of the l-th overtone at time t are respectively defined as $F_l^{(t)}$ and $A_l^{(t)}$. Phase change is approximated using a quadratic function so that a frequency may linearly change between frames from time t to time t+1. Amplitude change between frames is approximated using a linear function. The resynthesized dominant sound audio signal S(K) is represented as:

$$\theta_l(k) = \frac{\pi(F_l^{(t+1)} - F_l^{(t)})}{K} k^2 + 2\pi F_l^{(t)} k + \theta_{l,0}^{(t)}$$

$$s_l(k) = \left\{(A_l^{(t+1)} - A_l^{(t)}) \frac{k}{K} + A_l^{(t)}\right\} \sin(\theta_l(k))$$

$$s(k) = \sum_{l=1}^{L} s_l(k)$$

where $\theta_l(k)$ denotes the phase of the l-th overtone at time k and $S_l(k)$ denotes the waveform of the l-th overtone at time k.

Lowercase k stands for time in units of seconds. At time k, k=0. Uppercase K stands for a time difference between time k and time k+1, namely, a frame shift in units of seconds.

$\theta_{l,0}^{(t)}$ denotes the initial value of the phase. In the first or leading frame of the input signal, $\theta_{l,0}^{(t)} = 0$. In the subsequent frames, $\theta_{l,0}^{(t)}$ is represented using the frequency $F_l^{t-1}$) of the l-th overtone in the previous frame and the initial phase value of $\theta_{l,0}^{(t-1)}$ as follows:

$$\frac{\pi(F_l^{(t)} - F_l^{(t-1)})}{2K} + \theta_{l,0}^{(t-1)}$$

Returning to FIG. 1, the vocal-section feature extracting portion 7 extracts vocal-section features available to estimate vocal sections which include the vocals and non-vocal sections which do not include the vocals, from the dominant sound audio signal at each point of time, specifically every 10 msec. In this embodiment, the normalized 12th order logarithmic powers of overtones, the first order fundamental frequency F0, and a derivative ΔF0 of the first order fundamental frequency F0 are used as available vocal-section features. In this embodiment, the vocal-section feature extracting portion 7 extracts three kinds of features as vocal-section features (spectral features) available for vocal/non-vocal identification as described below.

Normalized 12th order logarithmic powers of overtones (First kind of spectral feature) and Fundamental frequency F0 (Second kind of spectral feature):

Vocal section detection or vocal activity detection is performed after accompaniment sound reduction based on the extraction of harmonic structure. This is interpreted as a problem with judgment of whether the extracted harmonic structure is vocal or non-vocal. In a system described in Reference 2, a spectral envelope of the extracted harmonic structure is estimated and distances with spectral envelopes in a training database are calculated. If a spectral envelope of a high-pitched sound having a high F0 is estimated using cepstrum or LPC analysis, estimation is significantly affected by spectral valleys between adjacent harmonic components. For this reason, the vocal section detection does not work properly for some musical pieces, especially those sung by female singers. In other words, a spectral envelope estimated from a harmonic structure is not always reliable except in a frequency band around each harmonic component. A harmonic structure may correspond to different spectral envelopes. Therefore, it is difficult to perfectly reconstruct the spectral envelope from the harmonic structure. Some spectral envelope estimation techniques such as MFCC or LPC estimate one possible spectral envelope. With such techniques, the distance between two harmonic structures, which have been originated from the same spectral envelope but have a different F0, cannot reasonably be reduced. To solve the problem, only reliable points on each harmonic component of the harmonic structure should be used in calculating the distance. In this embodiment, a focus is placed upon the fact that the powers of respective harmonic components of the fundamental frequency F0 can directly be compared between two sets of harmonic structures having substantially the same F0. Then, the power of each harmonic component is directly used as a feature and is compared only with the harmonic structures having close F0s in the training database. This approach may be robust even for high-pitched sounds having a high frequency since it is not necessary to estimate the spectral envelope, provided that there are sufficient training data.

Further, the fundamental frequency F0 is also used as a feature to ensure the comparisons only with harmonic structures having close F0s. The feature vector is modeled using GMM (Gaussian Mixture Model), and each Gaussian distribution of GMM covers the features having similar F0s. Gaussian distributions having significantly different F0s have extremely small effect on the calculation of the likelihood of GMM, thereby ensuring the comparisons only with harmonic structures having close F0s. An absolute value for the power of each overtone or harmonic component of the harmonic structure is biased depending upon the sound volume of each musical piece. For this reason, it is necessary to normalize the powers of overtones for each musical piece. Normalization will be described later.

Figure 5:
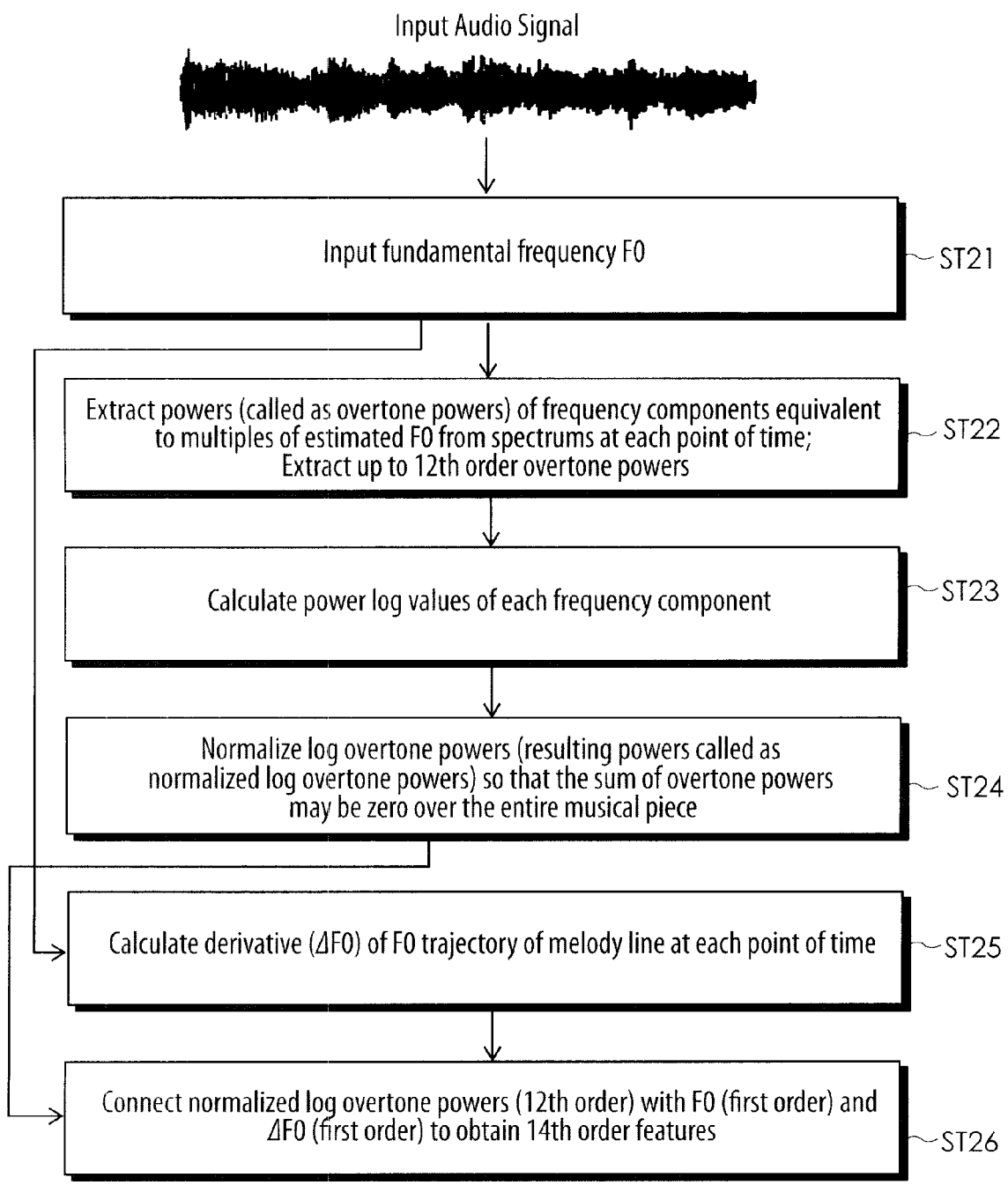
FIG. 5 is a flowchart showing the steps for vocal-section feature extraction.

The vocal-section feature extracting portion 7 of FIG. 1 extracts normalized h-th order logarithmic powers of overtones $P''_h$ by following the steps ST21 to ST24 in FIG. 5. In step ST21, a fundamental frequency F0 is input. Next in step ST22, up to h-th order powers of overtones (12t order powers in this embodiment) of the frequency components which are integral multiples of the fundamental frequency F0 are extracted from a spectrum of the dominant sound audio signal at each point of time. Then in step ST23, logarithmic values for up to the h-th order powers of the frequency components are calculated and the calculated values are defined as h-th order logarithmic powers of overtones. Further in step ST24, the h-th order logarithmic powers of overtones are normalized so that the sum of all the logarithmic powers of overtones may be zero throughout the musical piece. Thus, the h-th order (12th order in this embodiment) normalized logarithmic powers of overtones $p''_h$ are extracted. The normalized logarithmic powers of overtones are useful to clearly represent the features of the frame even if the fundamental frequency F0 is high.

The normalized logarithmic power of overtone $P''$ is calculated as follows:

$$p''_h = \log p'_h = \log p^t_h = \frac{\sum_{t'=1}^{T}\sum_{h'=1}^{H} \log p^{t'}_{h'}}{T \times H}$$

The first part $\log P^t_h$ of the above expression is a logarithm of the power of each frequency component of h-th order overtones. The second part of the above expression calculates an average of power logarithms of the frequency components over the entire musical piece. In the above expression, t stands for a point of time, T for the number of frames of one musical piece, and H for the number of extracted overtones (12 in this embodiment) where the number of frames refers to the number of frames sequentially picked up from signals of one musical piece very 10 msec using a window function having a predetermined frame width.

ΔF0 (Third Kind of Spectral Feature):

A derivative ΔF0 of the fundamental frequency F0 as calculated in step ST25 of FIG. 5 is used as the third kind of spectral feature. This feature is useful in representing dynamic properties of the singing voice or vocal. A derivative ΔF0 represents an inclination of the fundamental frequency F0 trajectory. It is commonly considered that singing voice tends to have temporal variation of F0 due to vibrato and therefore is expected to be a good cue for vocal/non-vocal identification. A regression parameter over five frames is used in calculating ΔF0 as shown below:

$$\Delta f[t] = \frac{\sum_{k=-2}^{2} k \cdot f[t+k]}{\sum_{k=-2}^{2} k^2}$$

where f[t] denotes a frequency in units of cents at time t.

Figure 6:
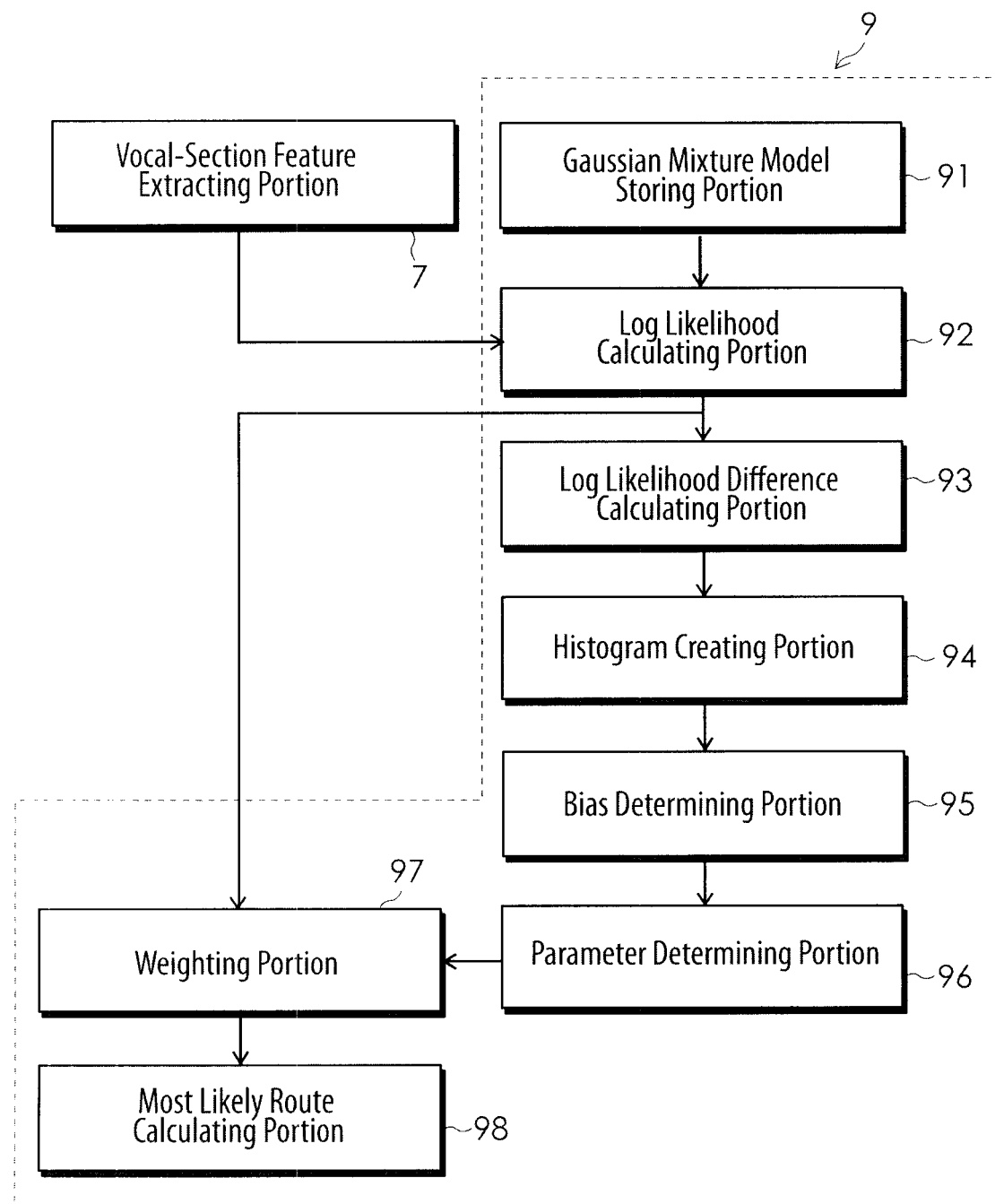
FIG. 6 is a block diagram illustrating a specific configuration of the vocal section estimating portion.
Figure 7:
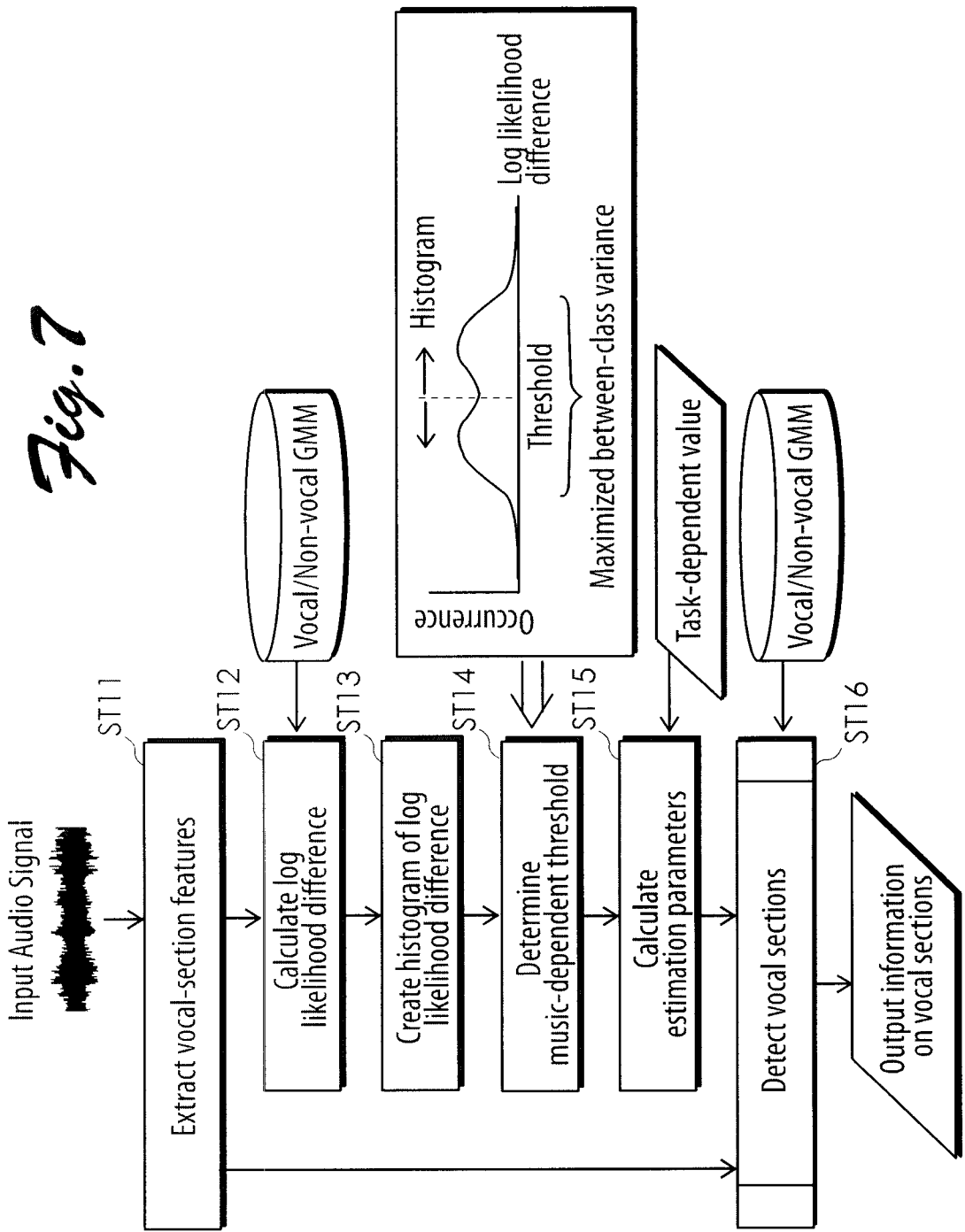
FIG. 7 is a flowchart showing the steps of implementing the vocal section estimating portion of FIG. 6 by running the computer program.
Figure 8:
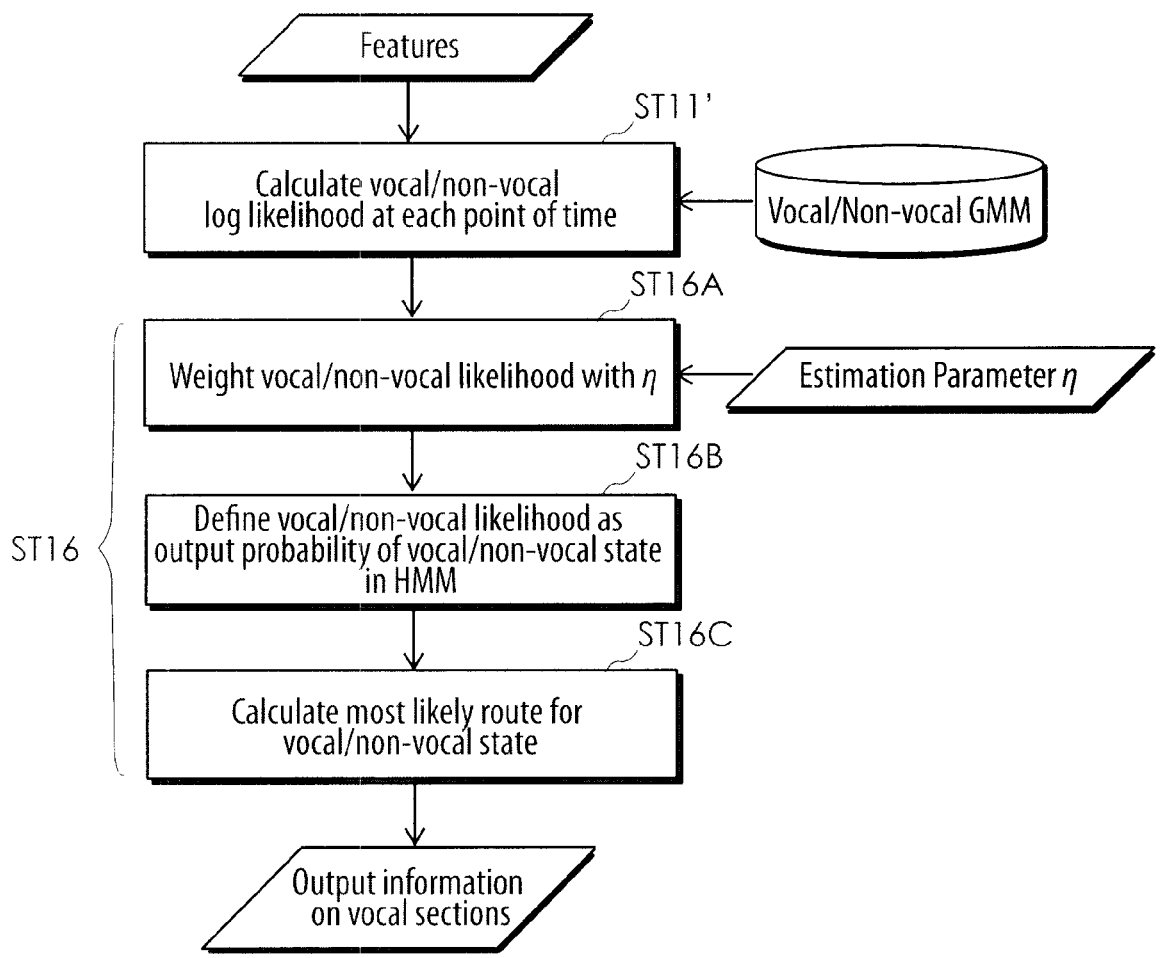
FIG. 8 is a flowchart showing the steps of implementing vocal section detection by running the computer program.

To execute the above-mentioned ST2 of harmonic structure extraction, the vocal section estimating portion 9 estimates the vocal sections and the non-vocal sections, based on a plurality of the vocal-section features extracted at respective points of time, and outputs information on the vocal sections and the non-vocal sections. The vocal section estimating portion 9 of this embodiment is configured as shown in FIG. 6. The vocal section estimating portion 9 of FIG. 6 is provided with a Gaussian mixture model storing portion 91 for storing a plurality of Gaussian mixture models or distributions of the vocal and non-vocal which have been obtained in advance by training based on the a plurality of training musical datasets, as shown in FIG. 2. The vocal section estimating portion 9 estimates vocal and non-vocal sections based on the vocal-section features and Gaussian mixture models or distributions over the entire period of the music audio signal S1 of one musical piece, and then outputs information on the vocal and non-vocal sections. The vocal section estimating portion 9 may include a log likelihood calculating portion 92, a log likelihood difference calculating portion 93, a histogram creating portion 94, a bias determining portion 95, a parameter determining portion 96, a weighting portion 97, and most likely route calculating portion 98. The log likelihood difference calculating portions 93, the histogram creating portion 94, the bias determining portion 95, and the parameter determining portion 96 are used in pre-processing prior to the estimation of vocal sections. FIG. 7 is a flowchart showing the steps of implementing the vocal section estimating portion 9 of FIG. 6 by running a computer program. FIG. 8 is a flowchart showing the steps of implementing the vocal section detection or vocal activity detection by running the computer program. FIG. 8 corresponds to details of steps ST11 and ST16 of FIG. 7. Step ST11' of FIG. 8 shows that the log likelihood is calculated also in step ST11 as with step ST12.

The log likelihood calculating portion 92 calculates a vocal log likelihood and a non-vocal log likelihood at each point of time over the entire period from the start to the end of the music audio signal S1, based on the vocal-section features extracted by the vocal-section feature extracting portion 7 in step ST11 and the Gaussian mixture models or distributions stored in advance in the Gaussian mixture model storing portion 91 during the pre-processing.

The log likelihood difference calculating portion 93 calculates a log likelihood difference between the vocal log likelihood and the non-vocal log likelihood at each point of time in step ST12. A log likelihood difference l(x) between the vocal log likelihood and the non-vocal log likelihood is calculated in connection with the vocal-section features (a sequence of feature vectors) extracted from the input music audio signal as follows:

$$l(x) = \log N_{GMM}(x; \theta_V) - \log N_{GMM}(x; \theta_N)$$

In the above expression, the first function denotes the vocal log likelihood and the second function denotes the non-vocal log likelihood. The histogram creating portion 94 creates a histogram relating to a plurality of log likelihood differences obtained from dominant sound audio signals extracted over the entire period of the music audio signal in step ST13. FIG. 7 shows an example histogram created by the histogram creating portion 94.

In step ST14, the bias determining portion 95 defines a threshold to maximize between-class variance, and determines the threshold as a music-dependent bias correction value $\theta_{dyn.}$ when the created histogram is divided into two music-dependent classes, namely, the log likelihood differences in the vocal sections and those in the non-vocal sections. FIG. 7 illustrates the threshold value. In step ST15, the parameter determining portion 96 determines an estimation parameter $\eta(\eta = \eta_{dyn.} + \eta_{fixed})$ used in estimating a vocal section by adding a task-dependent value $\eta_{fixed}$ to the bias correction value $\eta_{dyn.}$ in order to correct the bias correction value $\eta_{dyn.}$ or to increase alignment accuracy or adjust to broaden the vocal section. Since the likelihood for Gaussian mixture model (GMM) is biased depending upon the musical piece, it is difficult to universally define an estimation parameter $\eta$ suitable to all of the musical pieces. In this embodiment, the estimation parameter $\eta$ is divided into the bias correction value $\eta_{dyn.}$ and the task-dependent value $\eta_{fixed}$. The task-dependent value is manually determined, considering the kind or genre of each musical piece. The bias correction value $\eta_{dyn.}$ may automatically be determined for each musical piece through the steps described above or by using publicly known techniques for automatically determining the threshold. Alternatively, the bias correction value may be determined in advance based on typical music audio signals for training, depending upon the kind or genre of the music.

The weighting portion 97 weights the vocal log likelihood and the non-vocal log likelihood at each point of time using the estimation parameter $\eta$ in step ST16A of FIG. 8. In this embodiment, the vocal log likelihood and non-vocal log likelihood, which have been obtained during the pre-processing, are used in weighting. The weighting portion 97 approximates output probabilities of the vocal and non-vocal log likelihoods using the following expressions:

$$\log p(x | s_V) = \log N_{GMM}(x; \theta_V) - \frac{1}{2}\eta$$

$$\log p(x | s_N) = \log N_{GMM}(x; \theta_N) + \frac{1}{2}\eta$$

In the above expressions, $N_{GMM}(X;\theta)$ stands for the probability density function of Gaussian mixture model (GMM), and $\eta$ is the estimation parameter for adjusting the relationship of a hit rate and a correct rejection rate.

A parameter $\theta_V$ for vocal GMM and a parameter $\eta_N$ for non-vocal GMM are determined using vocal and non-vocal sections of the training musical datasets. A GMM having the mixture number of 64 was used in the experiments carried out by the inventors of the present invention, and the experiments have confirmed the effect of the GMM model.

Figures 9, 10:
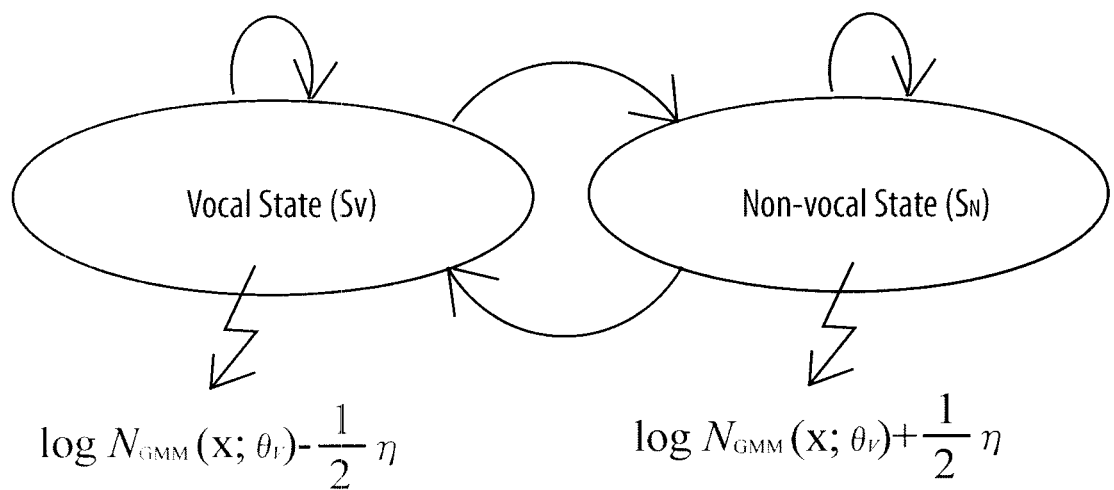
FIG. 9 is an illustration used to explain a Hidden Markov Model (HMM) transitioning back and forth between a vocal state ($S_V$) and a non-vocal state ($S_N$).
FIG. 10 tabulates analysis conditions for Viterbi alignment.

In step ST16B of FIG. the most likely route calculating portion 98 defines the weighted vocal log likelihoods and the weighted non-vocal log likelihoods, which are obtained over the entire period of the music audio signal, as an output probability of a vocal state ($S_V$) and an output probability of a non-vocal state ($S_N$) in a Hidden Markov Model, respectively. Then, the most likely route calculating portion 98 calculates the most likely routes for the vocal state and the non-vocal state over the entire period of the music audio signal in step ST16C, and determines information on the vocal and non-vocal sections over the entire period of the music audio signal, based on the calculated most likely routes. As shown in FIG. 9, a Hidden Markov Model (HMM) transitioning back and forth between the vocal and non-vocal states, $S_V$ and $S_N$, is used in detecting the vocal. The vocal state literally means "vocals are present" and the non-vocal state literally means "vocals are absent." Here, the most likely route is represented as:

$$\hat{S} = \{\hat{s}_1, \ldots, \hat{s}_t, \ldots\}$$

The most likely route calculating portion 98 searches the most likely routes of the vocal and non-vocal states based on a sequence of feature vectors extracted from the input music audio signal using the following expression:

$$\hat{S} = \underset{S}{\operatorname{argmax}} \sum_t \{\log p(x | s_t) + \log p(s_{t+1} | s_t)\}$$

In the above expression, $p(x|S_t)$ stands for an output probability of the state and $p(S_{t-1}|S_t)$ for a transition probability from the state $S_{t+1}$ to the state $S_t$.

During ordinary estimating operations other than pre-processing, the vocal section estimating portion 9 calculates the most likely route by directly weighting the vocal and non-vocal log likelihoods calculated by the log likelihood calculating portion 92 based on the vocal-section features outputted from the vocal-section feature extracting portion 7 at each point of time. In the pre-processing, the bias correction values $\eta_{dyn.}$ or thresholds are determined for vocal and non-vocal log likelihoods, using the histogram of log likelihood differences. Then, the bias correction value $\eta_{dyn.}$ suitable to a particular music audio signal may be determined. Weighting using the estimation parameter $\eta$ determined based on the bias correction value $\eta_{dyn.}$ thus determined allows adjustment of the vocal and non-vocal log likelihoods around the boundary between the vocal and non-vocal states, following a tendency of vocal-section features appearing due to differences in audio properties of music audio signals for each musical piece. Consequently, boundaries between the vocal and non-vocal sections may properly be adjusted for individual musical pieces.

Returning to FIG. 1, the temporal-alignment feature extracting portion 11 extracts temporal-alignment features appropriate for temporal alignment between lyrics of the vocals and the music audio signal from the dominant sound audio signal at each point of time. Specifically, in this embodiment, the 25th order features including a resonance property of the phoneme are extracted as temporal-alignment features. This is a pre-processing step necessary for the subsequent alignment. Details will be described later with reference to the analysis conditions for Viterbi alignment shown in FIG. 10. The 25th order features are extracted in this embodiment, including the 12th order MFCCs, the 12th order ΔMFCCs, and a Δ power.

The phoneme network storing portion 13 stores a phoneme network SN including a plurality of phonemes in connection with the lyrics of the musical piece corresponding to the music audio signal. For example, Japanese lyrics are first converted into a sequence of phonemes. Then, a phrase boundary is converted into a filler and a word boundary is converted into one short pause. Thus, the phoneme network is constituted. Preferably, the lyrics may be converted into a sequence of phonemes including vowels and consonants, short pauses, and fillers. Based on text data of given lyrics, alignment grammar is created and then defined as a sequence of phonemes for alignment.

Generally, the sequence of phonemes for alignment for Japanese lyrics includes blanks or short pauses (sp) as well as vowels and consonants. This is because an unvoiced consonant does not have a harmonic structure and cannot be extracted by accompaniment sound reduction method, and stable estimation of the fundamental frequency F0 is difficult since a voiced consonant is short when uttered. Specifically, the lyrics are directly converted into a sequence of phonemes. Substantially, this process is equivalent to converting oral readings of the lyrics into Roman characters or Romanized transliteration. Then, following two rules (Japanese grammar) as shown below, the sequence of phonemes in a form of Romanized transliteration is converted into a sequence of phonemes for alignment.

Rule 1: to convert sentence and phrase boundaries in the lyrics into a filler instead of a plurality of short pauses (sp).

Rule 2: to convert a word boundary into one short pause.

The above rules 1 and 2 may apply to English lyrics.

Figure 11:
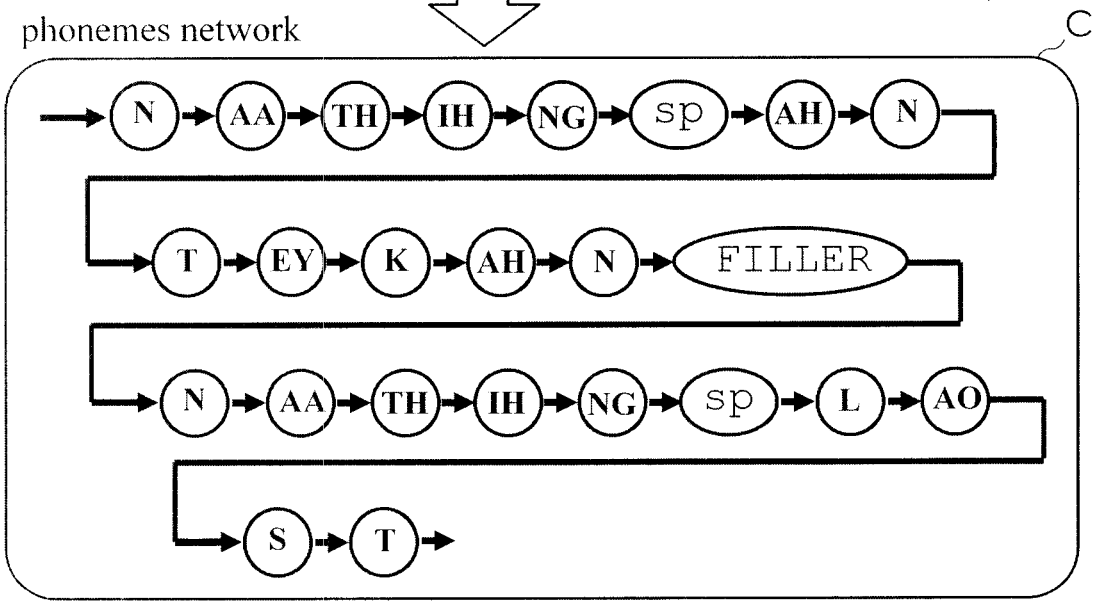
FIG. 11 shows an example conversion of lyrics to a sequence of phonemes for alignment.

FIG. 11 shows an example conversion of English original lyrics into a sequence of phonemes for alignment (phoneme network). First, text data A representing phrases of original lyrics are converted into a sequence of phonemes B. Then, the sequence is further converted into a sequence of phonemes C for alignment including vowels and consonants, a filler, and short pauses (sp) by applying the "grammar" to the sequence of phonemes B.

Figure 12:
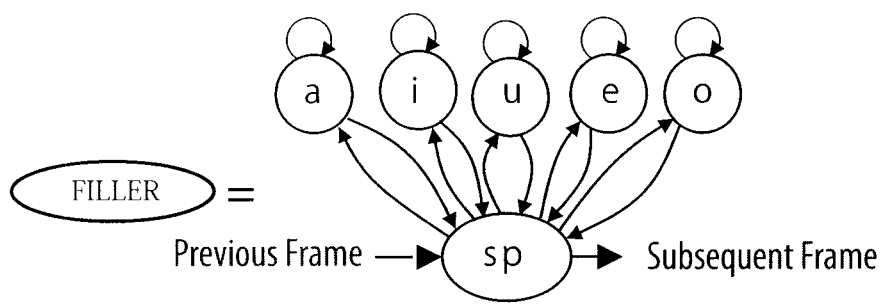
FIG. 12 conceptually illustrates a filler configuration.
Figure 13:
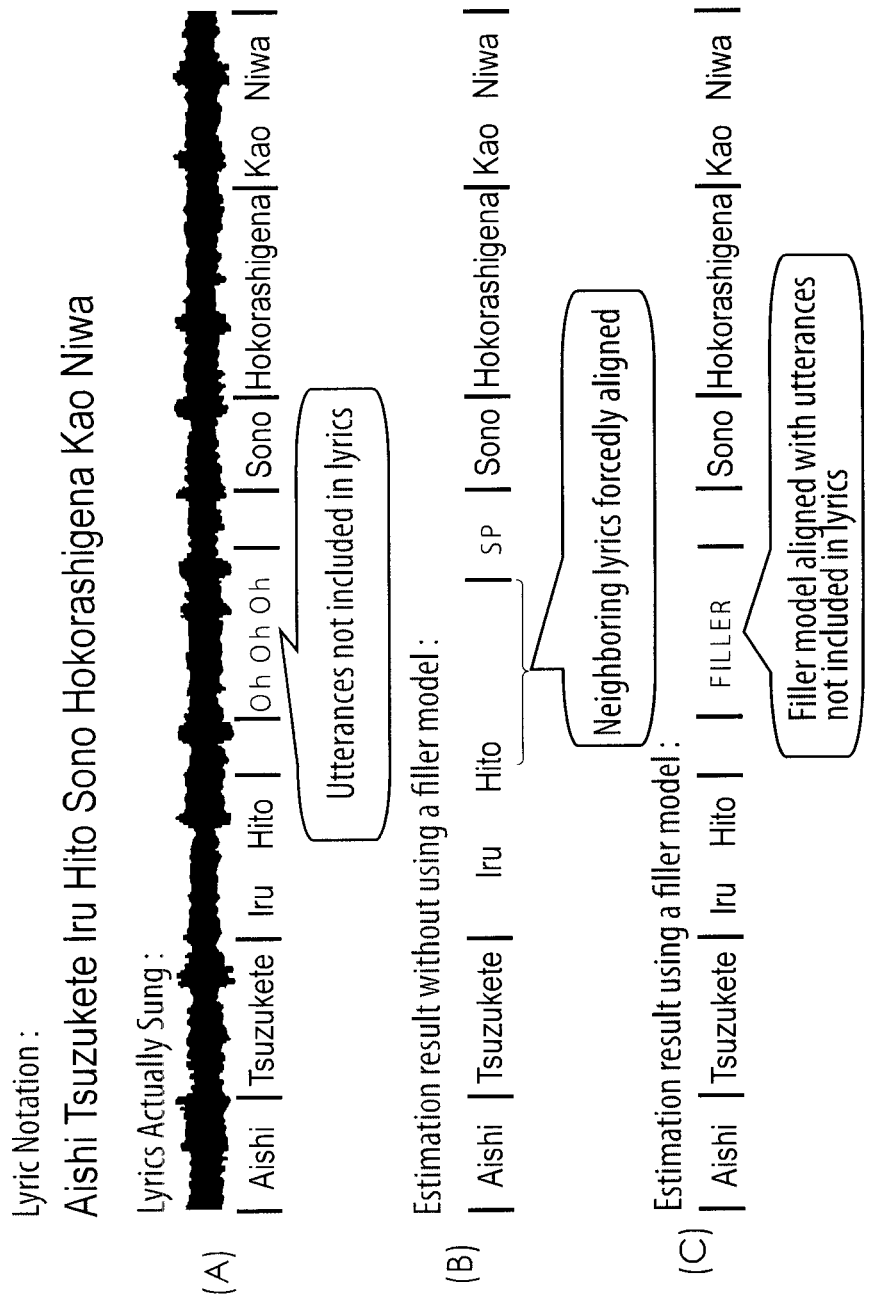
FIGS. 13A to 13C are illustrations used to explain the functionality of a filler model.

In this example, the English lyrics A, "Nothing untaken. Nothing lost." are converted into the sequence of phonemes B of "N AA TH IH NG AH N T EY K AH N N AA TH IH NG L AO S T" and are further converted into the sequence of phonemes C for alignment including vowels and consonants as well as short pauses (sp) and a filler. The sequence of phonemes C for alignment is a phoneme network SN. Here, a filler is a special short pause for absorbing all of vowel phonemes. FIG. 12 shows the functionality of a filler. Utterances or vowel phonemes not included in the lyrics, for example, "Oh, Oh, Oh" located at a FILLER are replaced by a filler regardless of the number of utterances. In other words, such vowel phonemes are absorbed into a filler, and are not aligned with the lyrics. The filler has been used in speech recognition techniques, but has not been used in singing voice recognition. FIGS. 13A to 13C conceptually illustrate the functionality of a filler model. FIG. 13A shows actual Japanese lyrics written in alphabets. The lyrics are "Aishi Tsuzukete Iru Hito Sono Hokorashigena Kao Niwa". In this example, there are utterances not written in the lyrics, "Oh, Oh, Oh" at a phrase boundary. FIG. 13B shows that the utterances of "Oh, Oh, Oh" located at a phrase boundary are replaced by short pauses and are forcedly aligned with the neighboring lyrics as is done by the technique shown in Reference 2. FIG. 13C shows that short pauses located at a boundary between two phrases are replaced by a filler according to the present invention. The utterances of "Oh, Oh, Oh" are replaced by a filler, namely, absorbed into a filler, and are not aligned with the lyrics.

Repeatedly speaking, the present embodiment employs a filler model as described above, in order to reduce errors due to the utterances not written in the lyrics. As shown in FIG. 12, the filler model allows any number of vowels to appear any times between two adjacent phrases. The filler model absorbs any number of vowels appearing any times and does not align them with the lyrics. In conventional or existing systems, a phoneme /sp/ representing a short pause is used to represent a short-period non-vocal section. If a singer utters some word not written in the lyrics in a non-vocal section, the phoneme /sp/ trained by using non-vocal sections cannot represent such utterance. The existing or conventional systems wrongly align the non-vocal section with the lyrics which will otherwise be aligned to some other section. Introduction of the filler model eliminates misalignment of such utterances between phrases with the lyrics since the utterances are represented by vowel phonemes in the filler model.

Figure 14:
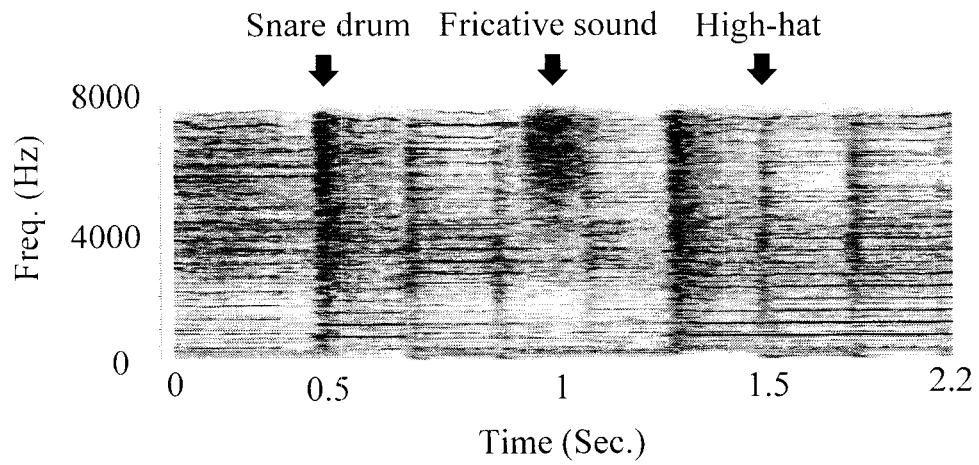
FIG. 14 shows an example spectrogram including snare drum sounds, fricative sounds, and high-hat cymbal sounds.
Figure 15:
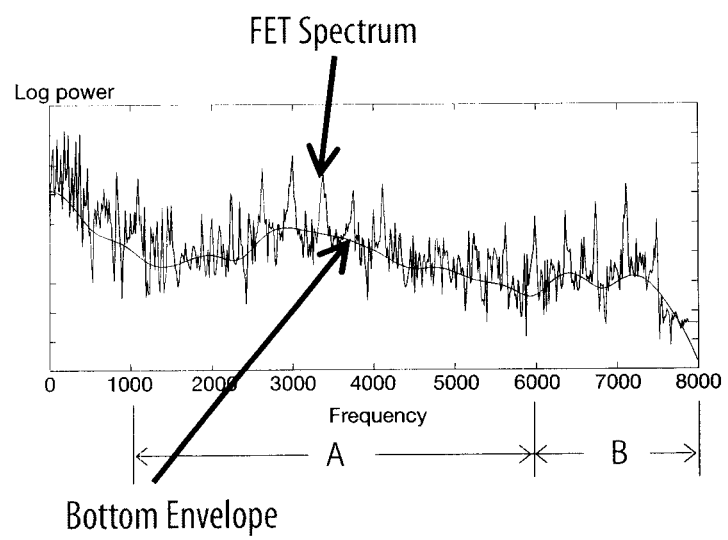
FIG. 15 shows an example bottom envelope of the spectrum.
Figure 16:
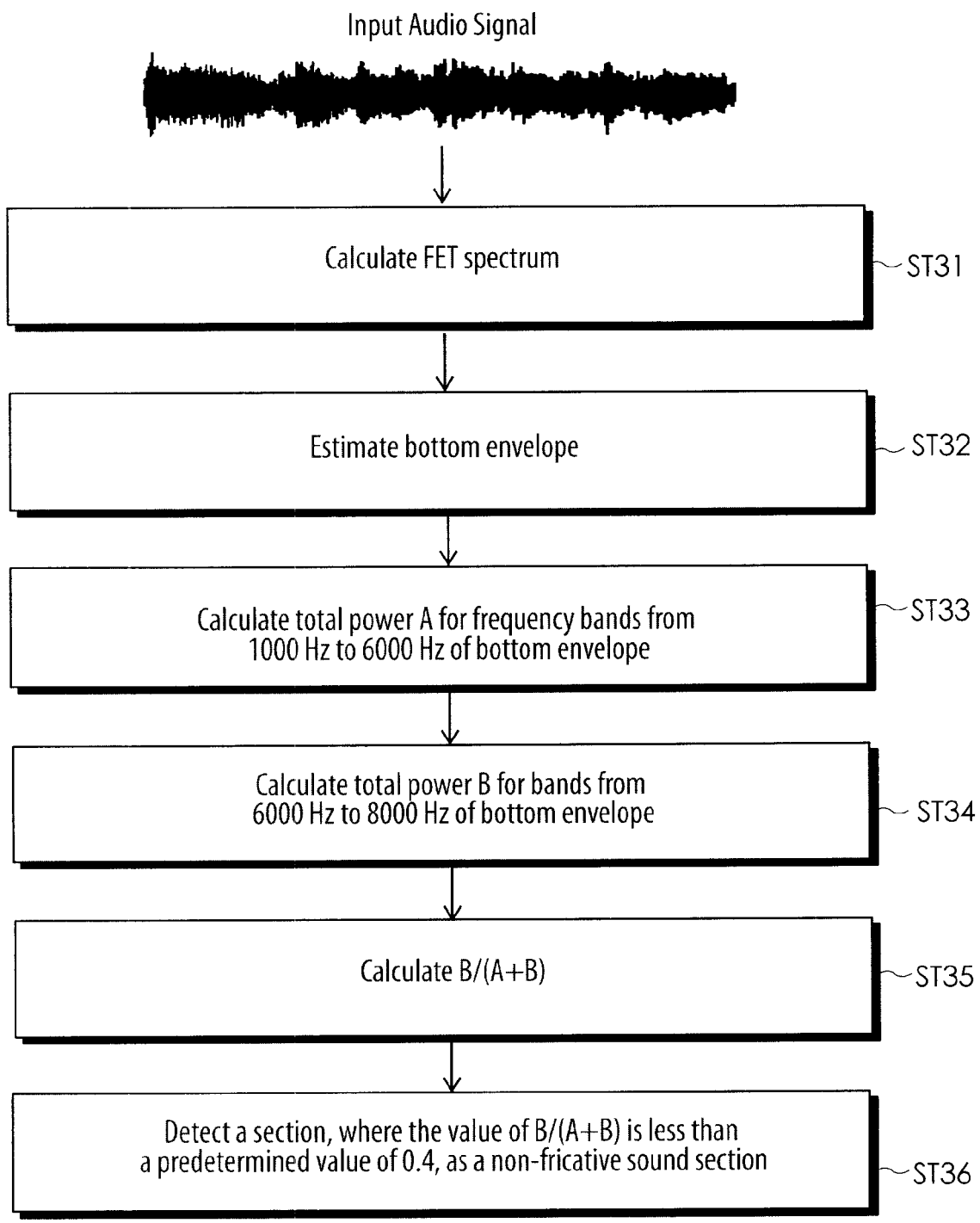
FIG. 16 is a flowchart showing the steps of extracting non-fricative sound sections or nonexistence regions of fricative sounds.

Returning to FIG. 1, the non-fricative section extracting portion 4 extracts sections where no fricative sounds exist. Now, an example extraction of a non-fricative sound section will be described below. FIG. 14 shows an example spectrogram including inharmonic sound sources such as snare drum sounds, fricative sounds, and high-cymbal sounds. An inharmonic sound source is represented as a frequency component spreading longitudinally in the spectrogram. A harmonic sound source is represented as a frequency component spreading laterally in the spectrogram. The longitudinally spreading frequency component appears as being flat, and the laterally spreading frequency component appears as having a peak. In order to detect flat frequency components due to the inharmonic sound sources, frequency components having respective peaks should be removed. The embodiment of the present invention employs a technique for estimating a spectral bottom envelope as proposed by Hirokazu Kameoka et al. in "Selective amplifier of periodic and non-periodic components in concurrent audio signals with spectral control envelopes" in Study Report, Information Processing Society of Japan, 2006-MUS-66-13, pp. 77.84, September 2006. The bottom envelope is defined as an envelope curve passing through spectral valleys as shown in FIG. 15. FIG. 16 shows the steps of extracting a non-fricative sound section or a nonexistence region of fricative sounds, using the bottom envelope shown in FIG. 14. In step ST31, a frequency spectrum of an input music audio signal at each point of time is calculated using Fourier transform (FFT). In step ST32, a bottom envelope is estimated from the frequency spectrum shown in FIG. 14. Next in step ST33, a total logarithmic power A is calculated for bands not including the features of fricative sounds (1000 Hz to 6000 Hz in an example of FIG. 15) among available bands of the estimated bottom envelope (1000 Hz to 8000 Hz in the example of FIG. 15). In step ST34, a total logarithmic power B is calculated for high frequency bands including frequency components included in fricative sounds (6000 Hz to 8000 Hz in the example of FIG. 15). Then in step ST35, a section where the ratio of B/(A+B) is less than a predetermined value (0.4 in FIG. 14) is extracted as a non-fricative sound section, where A+B denotes the total logarithmic power in all the available bands of the bottom envelope and B denotes the total logarithmic power in the high frequency bands. The available bands refer to a band range within which the features of fricative sounds appear in the bottom envelope. It has been found by tests that the available bands are 1000 Hz to 8000 Hz and the high frequency bands are 6000 Hz to 8000 Hz. The predetermined value varies among singers, but a value of about 0.4 is found to be preferable through the tests.

How to extract a non-fricative sound section or a nonexistence region of fricative sounds where no fricative sounds exist will be described below. The function class of a bottom envelope shown in FIG. 15 is defined as follows:

$$g(f;a) = \sum_{i=1}^{I} a_i N(f; 400 \times i, 200^2)$$

In the above expression, f denotes a frequency in units of Hz and $N(x, m, \delta^2)$ denotes a Gaussian distribution. $a = (a_i, \ldots a_I)$ denotes a weight for each Gaussian distribution. The bottom envelop may be estimated by estimating a which minimizes the objective function represented in the following expression.

$$J = \int \left( \frac{g(f;a)}{S(f)} - \log \frac{g(f;a)}{S(f)} \right) df$$

In the above expression, S(f) denotes a spectrum of each frame. The objective function is an asymmetric distance measure which imposes heavier penalty on or penalizes negative errors than positive errors. The following two expressions are iterated in order to estimate a on the left-hand side of the following expression, based on the objective function.

$$\hat{a}_i = \frac{m_i(f) df}{\int \frac{N(f; 400 \times i, 200^2)}{S(f)} df}$$

$$m_i(f) = \frac{a'_i N(f; 400 \times i, 200^2)}{\sum \forall_i a'_i N(f; 400 \times i, 200^2)}$$

In she above expressions, $a'_i$ denotes an estimated value at the previous iteration. The bottom envelop of the spectrum S(f) is thus estimated as g(f,a.).

The frequency components of fricative sounds tend to concentrate around a particular frequency band of the spectrum. For this reason, fricative sounds are detected using the ratio [B/(A+B)] of the power B of that frequency band of the bottom envelope to the power (A+B) of other frequency bands. For example, the sampling frequency is 16 kHz as the data shown in FIG. 15 are sampled. Among the fricative sounds, only phoneme of /SH/ are dealt with since the frequency components of the phoneme concentrate on bands of Nyquist frequency 8 kHz or less. The degree of existence is defined for /SH/ which has strong concentrated components from 6 kHz to 8 kHz as follows:

$$E_{SH} = \frac{\int_{6000}^{8000} g(f, \hat{a}) df}{\int_{1000}^{8000} g(f, \hat{a}) df}$$

In an example of FIG. 16, sections where the $E_{SH}$ thus obtained is below a threshold of 0.4 are identified as non-fricative sound section or nonexistence regions of fricative sounds where no phonemes /SH/ exist. The threshold value of 0.4 has been experimentally determined. Frequency components of 1 kHz or less are not used in the calculation in order to avoid the effect of frequency components attributed to bass drums.

Returning to FIG. 1, to execute the above-mentioned ST3 of resynthesis, the alignment portion 17 is provided with a phone model 15 for singing voice that estimates phonemes corresponding to temporal-alignment features or features appropriate for temporal alignment based on the temporal-alignment features. The alignment portion 17 performs temporal alignment between the dominant sound signals and the phonemes in the phoneme network. Specifically, the alignment portion 17 receives, as inputs, temporal-alignment features outputted from the temporal-alignment feature extracting portion 11, the information on the vocal and non-vocal sections outputted from vocal-section estimating portion 9, and a phoneme network stored on the phoneme network storing portion 13, and performs alignment using the phone model 15 for singing voice on condition that no phonemes exist at least in non-vocal sections. Thus, temporal alignment between the music audio signal and lyrics is automatically done.

The alignment portion 17 of this embodiment is configured to perform an alignment operation using Viterbi alignment. "Viterbi alignment" is known in the field of speech recognition, and is one of the techniques for searching an optimal solution designed to identify the most likely route between a music audio signal and grammar (a sequence of phonemes for alignment, namely a phoneme network) using the Viterbi algorithm. The Viterbi alignment is performed on condition that no phonemes exist in the non-vocal sections, namely, at least a non-vocal section is defined as a short pause, and that no fricative phonemes exist in non-fricative sound sections. Then, likelihoods for other phonemes are set to zero in the short pause (sp). Since the likelihoods for other phonemes are zero in the short pause sections, the information on the vocal sections may be utilized, thereby attaining highly accurate alignment. If it is defined that no fricative phonemes exist in the non-fricative sound sections, it may be possible to solve an issue that sounds, especially unvoiced sounds cannot accurately be aligned.

Figure 17:
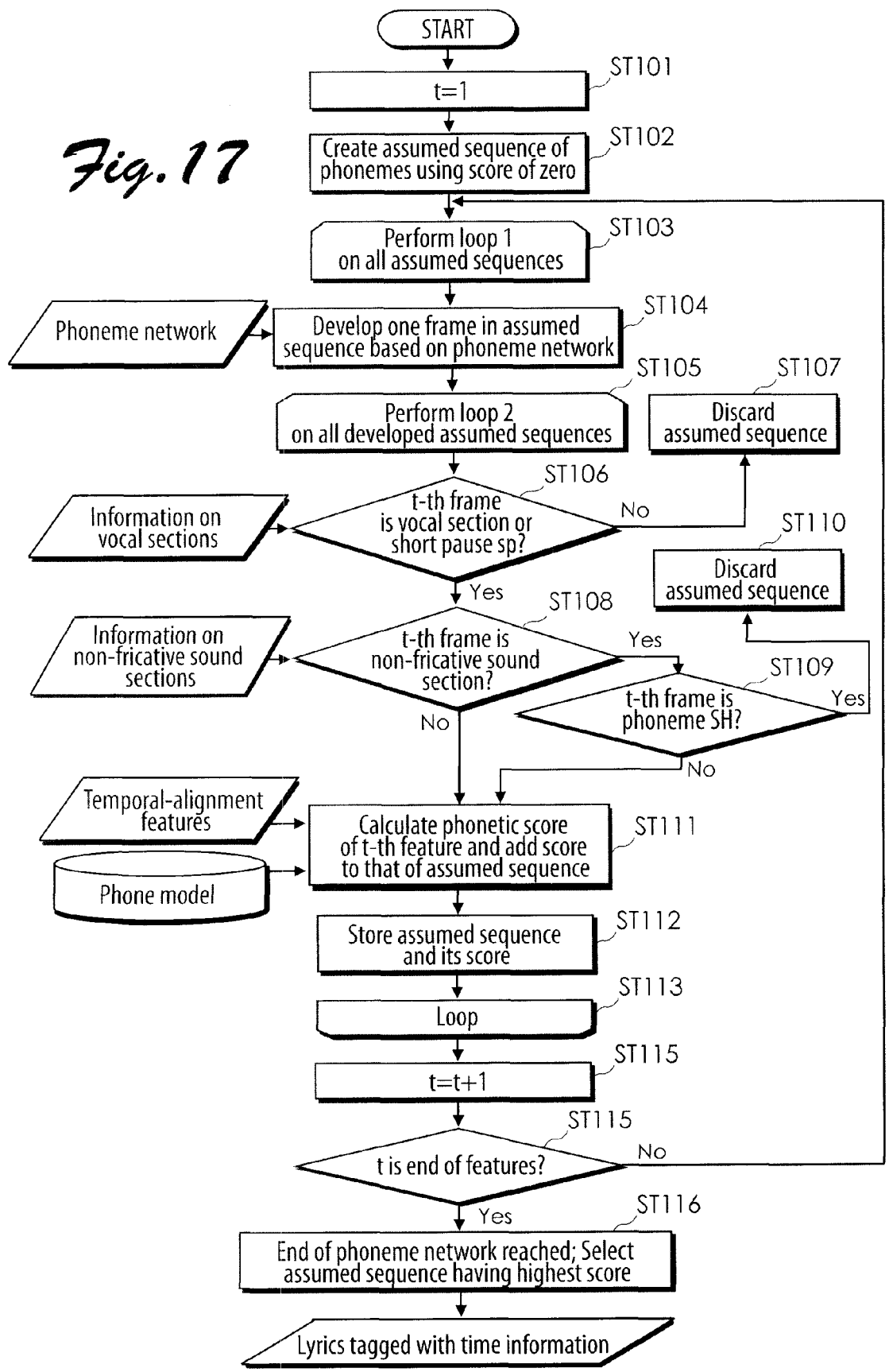
FIG. 17 is a flowchart showing an algorithm of the computer program which implements the alignment portion in the computer.

FIG. 17 is a flowchart showing an algorithm of the computer program which implements the alignment portion 17 in the computer using the Viterbi alignment called as "frame synchronization Viterbi search". In the following description of the alignment operation, Japanese lyrics are used as an example. t=1 in step ST 101 indicates an initial frame into which the first temporal-alignment feature is inputted. In the description of FIG. 17, the temporal-alignment feature is simply called as "a feature." In step ST102, an empty assumed sequence is created using a score of zero (0). "An assumed sequence" refers to "a sequence of phonemes" up to the present point of time. To create an empty assumed sequence means to set a state in which no phonemes exist.

In step ST103, loop 1 is performed on all of the currently assumed sequences of phonemes. Loop 1 is to calculate scores for each of the currently assumed sequences as of the point of time that the previous frame has been processed. For example, it is assumed that temporal alignment should be performed in connection with a phoneme network of "a-i-sp-u-e . . . ". In this example, a possible assumed sequence of phonemes up to the sixth frame or the sixth phoneme may be "a a a a a a" or "a a a i i i" or "a a u u sp u" or others. In the process of the search, these possible assumed sequences are retained at the same time and calculation is performed on all of the assumed sequences. These assumed sequences have respective scores. Assuming that there are six frames, the score is obtained from calculations of possibilities or log likelihoods that features of each frame up to the sixth frame may correspond to, for example, a sequence of phonemes of "a a a i i i" by comparing the features with a phone model. For example, once the sixth frame (t=6) has been processed and then processing of the seventh frame is started, calculations are done on all of the currently retained assumed sequences. The processing as described above is Loop 1.

In step ST104, "one frame is developed in the assumed sequence" based on the phoneme network. "One frame is developed" means extending the length of the assumed sequence by one frame. When one frame is developed, there is a possibility that a new phoneme will follow the end of the current sequence and a plurality of assumed sequences will newly be created since the new frame till a next point of time is taken into consideration. The phoneme network is referenced in order to search a possible subsequent phoneme. For example, when the phoneme network is referenced in connection with the assumed sequence of "a a a i i i," two new assumed sequences may be assumed: "a a a i i i i" in which one "i" is assumed in the next frame, or "a a a i i i sp" in which the sequence is followed by a short pause sp in the next frame. In this example, once "one frame is developed" in one assumed sequence, two new assumed sequences are created with consideration given to the next frame in the time series. In step ST105, loop 2 is performed on all of the assumed sequences of phonemes. Loop 2 is to calculate scores for each of the newly created assumed sequences as a result of one frame development. Score calculations are the same as those in loop 1. Since some assumed sequences are furthermore created each from the currently retained assumed sequences, loop 2 performs score calculations on all of the newly created assumed sequences.

Next in step ST106, it is determined whether the t-th frame is a vocal section or a phoneme is a short pause (sp) based on the information on the vocal and non-vocal sections outputted from the vocal section estimating portion 9. For example, the information on the vocal and non-vocal sections indicates that the 7th frame is a non-vocal section. Then, when the 7th frame of the assumed sequence is developed, a assumed sequence of "a a a i i i i" is impossible while a assumed sequence of "a a a i i i sp" is possible. Impossible assumed sequences will be discarded in step ST107. Impossible assumed sequences may be discarded through steps ST106 and ST107 with reference to the information on the vocal and non-vocal sections, thereby facilitating the alignment. In step ST106, if "Yes", the process goes to step ST108.

In step ST108, it is determined whether the t-th frame is a non-fricative sound section or a nonexistence region of fricative sounds, using the information on non-fricative sound sections outputted from the non-fricative section extracting portion 9. If the information indicates that the 7th frame is a non-fricative sound section, a assumed sequence of "a a a i i i i" is possible while a assumed sequence of "a a a i i i sh" is impossible. Impossible assumed sequences will be discarded through steps ST109 and ST110. If it is determined that no fricative phonemes sh exist in the non-fricative sound section in step ST109, the process goes to step ST111. If it is determined that it is not a non-fricative sound section in step ST108, the process goes to step ST111. Thus, impossible assumed sequences may be discarded through steps ST108 to ST110 with reference to the information on the non-fricative sound sections, thereby facilitating the alignment.

In step ST111, the phonetic score of the t-th features are calculated using the input features and phone model, and the result is added to the score of the assumed sequence. Namely, the t-th features are compared with the phone model and the log likelihood (or score) is calculated. Then, the calculated score is added to the score of the assumed sequence. In other words, the score calculation is to calculate how much the features are similar to the information on phonemes existing in the phone model by comparing the features with the phone model. Since the score is calculated by logarithm, the score will be $-\infty$ if it is determined that the features are not similar to the phone model at all. In step ST111, score calculations are performed on all of the assumed sequences. Once the calculations are completed in step ST111, the process goes to step ST112 where the assumed sequences and their scores are retained. In step ST113, loop 2 corresponding to step ST105 is completed. In step ST114, loop 1 corresponding to step ST103 is completed. Then, in step ST115, the target point of time is incremented by one (1) to (t+1) and a next frame will be processed. In step ST116, it is determined whether or not the inputted frame is the end or terminal of the features that are being inputted. Until all of the features are inputted, steps ST103 through ST115 are repeated. Once all of the features have been processed, the process goes to step ST117. At this point, the end of the phoneme network has been reached for the comparison of the features with phone model. The assumed sequence of phonemes having the highest score is selected as a final selection from among the assumed sequences for which the end of the phoneme network has been reached. This final selection or finally selected assumed sequence of phonemes has been defined based on the features corresponding to the points of time. In other words, the finally selected sequence of phonemes is a sequence of phonemes synchronized with the music audio signals. Therefore, lyric data to be displayed based on the finally selected sequence of phonemes will be "lyrics tagged with time information" or lyrics having time information required for synchronization with the music audio signals.

Figure 18:
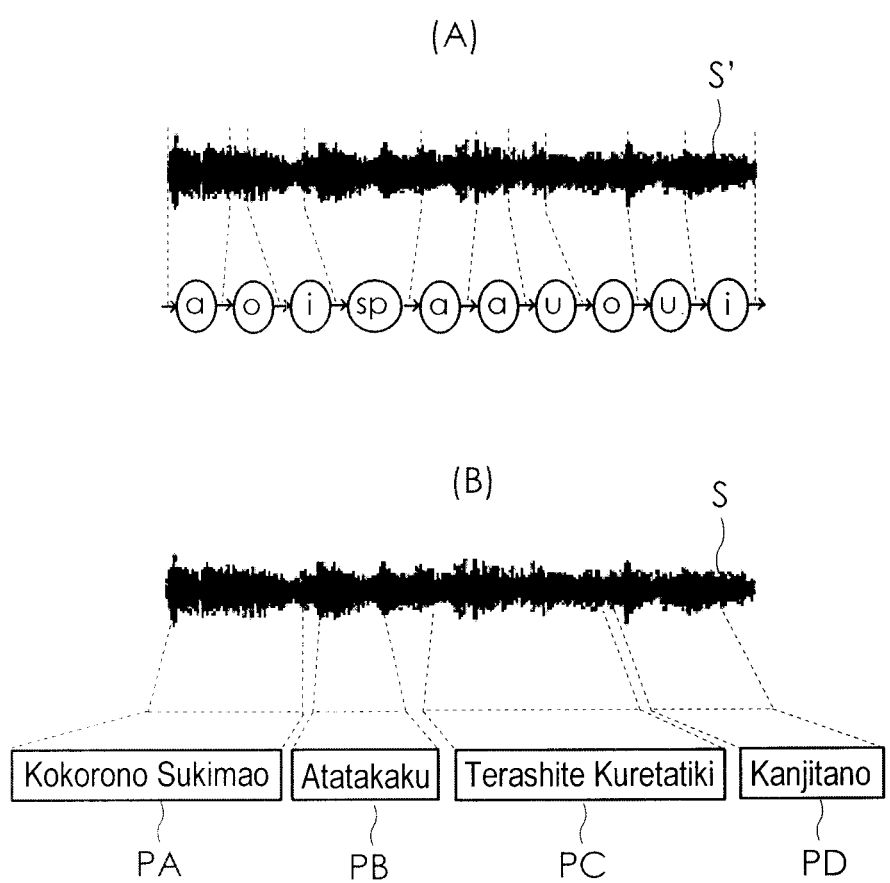
FIG. 18 (A) shows that a phoneme network is temporally aligned by Viterbi alignment with the waveform of a dominant sound audio signal extracted from a music audio signal at a particular point of time.

FIG. 18A shows that a phoneme network is temporally aligned by Viterbi alignment with the waveform S' of a dominant sound audio signal extracted from a music audio signal at a particular point of time, or the waveform of the audio signal with reduced accompaniment sounds. Once the alignment is completed, "lyrics tagged with time information" or lyrics having time information is finally obtained by restoring the sequence of phonemes (grammar) for alignment having time information to the form of lyrics. For simplicity, FIG. 18A shows vowels only.

FIG. 18B shows that temporal alignment is completed between the music audio signal S of polyphonic sound mixture or mixed sounds including accompaniment sounds and the lyrics that have been restored from the sequence of phonemes (or grammar). The Japanese lyrics are represented in alphabets. PA through PD in the figure denote lyric phrases. The lyrics for phrase PA are "Kokorono Sukimawo"; the lyrics for phrase PB are "Atatakaku"; the lyrics for phrase PC are "Terashite Kureta Toki"; and the lyrics for phrase PD are "Kanjitano".

Next, the phone model 15 for singing voice that is used in the alignment portion 17 will be described below. Ideally, the phone model 15 for singing voice is a phone model that has been trained based on a large amount of datasets for alignment of vocal utterance (lyrics). At the present, however, such database has actually not been built up. In this embodiment, a phone model is obtained by re-estimating (training) parameters of a phone model for speaking voice or speech so as to recognize vocal phonemes of music or a musical piece including vocals and accompaniment sounds.

The phone model for singing voice is adapted based on the phone model for speaking voice in the following three steps. Prior to the adaptation, "a phone model for speaking voice" should be prepared. This step is publicly known, and descriptions thereof are omitted herein.

The adaptation technique consists of the following three steps:

(1) To adapt the phone model for speaking voice to vocals without accompaniments;

(2) To adapt the phone model for vocals without accompaniments to segregated vocals extracted by accompaniment sound reduction method; and (3) To adapt the phone model for segregated vocals to a particular musical piece or a particular singer in the input music.

The steps of (1) through (3) are all carried out for "training" as shown in FIG. 2, prior to the runtime.

As shown in FIG. 2, the phone model 101 for speaking voice is adapted to phoneme labels 102 (trainer information) and vocals without accompaniments 103, thereby creating a phone model 104 for vocals without accompaniments, in adaptation step (1). The phone model 104 for vocals without accompaniments is adapted to phoneme labels 102 (trainer information) and vocal data 105 including dominant sound audio signals extracted by accompaniment sound reduction method, thereby creating a phone model 106 for segregated vocals, in adaptation step (2). The phone model 106 for segregated vocals is adapted to particular phoneme labels (phoneme network) and features in the input music, thereby creating a phone model 107 for a particular singer, in adaptation step (3). In the example of FIG. 2, the phone model 107 for a particular singer is used as the phone model 15 for singing voice of FIG. 1.

All of the steps of (1) through (3) are not necessarily carried out. For example, only step (1) may be carried out and this is called as "one-step adaptation". Alternatively, steps (1) and (2) may be carried out and this is called as "two-step adaptation". Or, all of steps (1) through (3) may be carried out and this is called as "three-step adaptation". Adaptation of the phone model may arbitrarily be carried out by combining one or more of the three steps mentioned above.

The trainer information refers to time information for each phoneme (the start time and end time of the phoneme). If the phone model for speaking voice is adapted using the trainer information such as vocal data without accompaniments 103 and phoneme labels 102, phoneme data are used for which exact segmentation has been done based on the time information.

Figure 19:
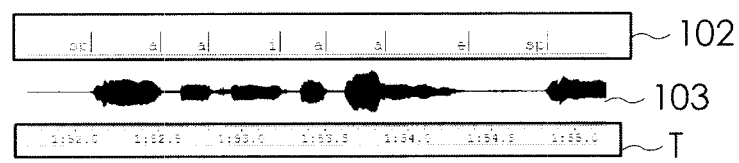
FIG. 19 shows an example phoneme label for adaptation, accompanied by time information.

FIG. 19 shows an example of phoneme label 102 for adaptation, intended for Japanese lyrics tagged time information. The phoneme label 102 of FIG. 19 has been annotated manually. The maximum likelihood linear regression (MLLR) and the maximum a posteriori probability (MAP) may be combined for use with parameter estimation in the adaptation steps. When MLLR and MAP are combined for use, the result obtained from MLLR adaptation is used as a prior probability distribution like an initial value in MAP estimation.

Figure 20:
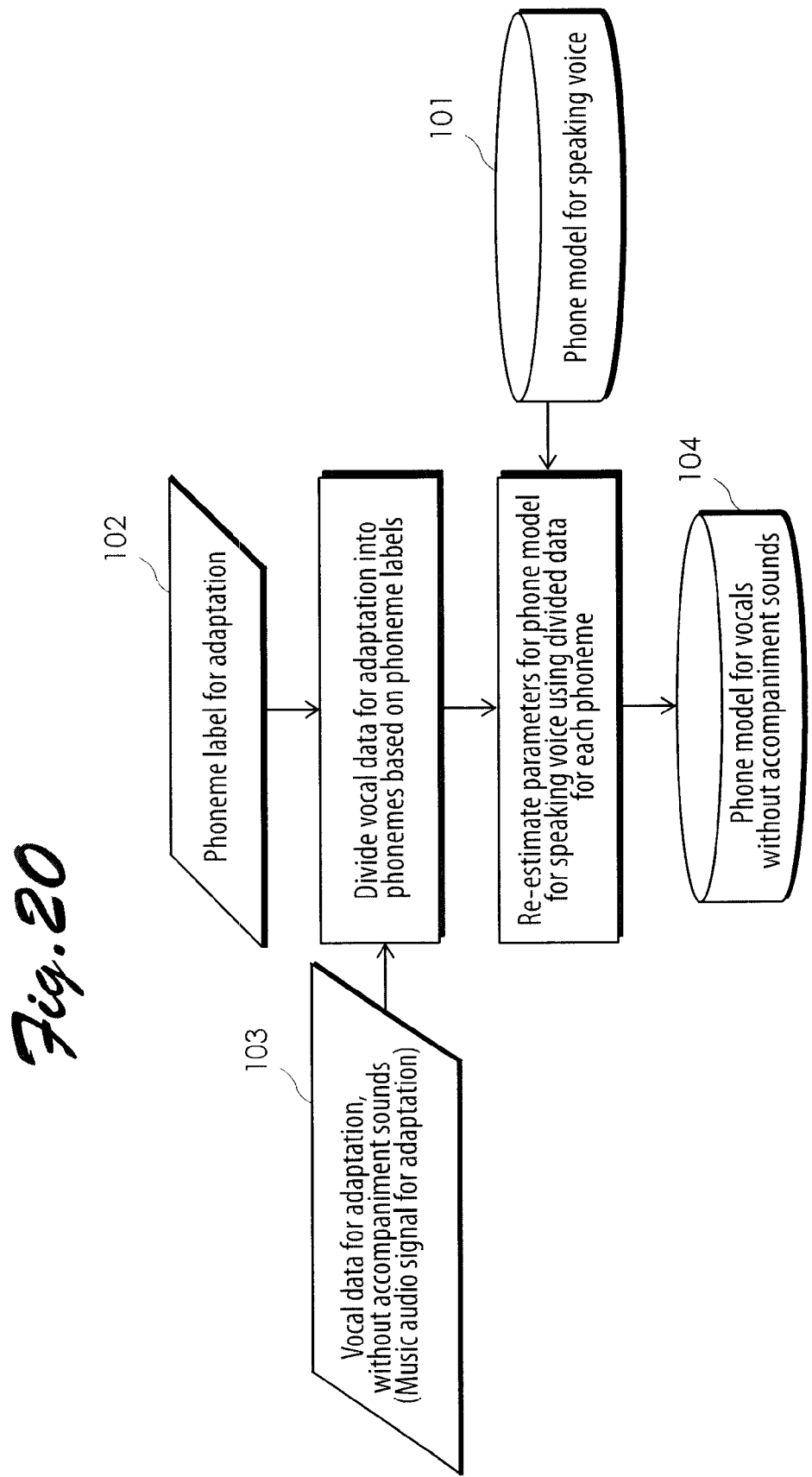
FIG. 20 is a flowchart showing the steps of creating a phone model.

The adaptation technique of the phone model will be more specifically (described below. FIG. 20 is a flowchart showing details of the one-step adaptation mentioned above. In the one-step adaptation, vocal data without accompaniments or music audio signal 103 for adaptation is divided into phonemes, based on the phoneme label 102 for adaptation corresponding to the music audio signal 103. Then, using divided data for each phoneme, parameters of the phone model 101 for speaking voice are re-estimated so as to recognize vocal phonemes in the music audio signal 103 for adaptation, thereby obtaining the phone model 104 for vocals without accompaniments that is used as the phone model 15 for singing voice. The phone model 104 of this type is suitable for vocals without accompaniments or vocals with accompaniments smaller than the vocals.

Figure 21:
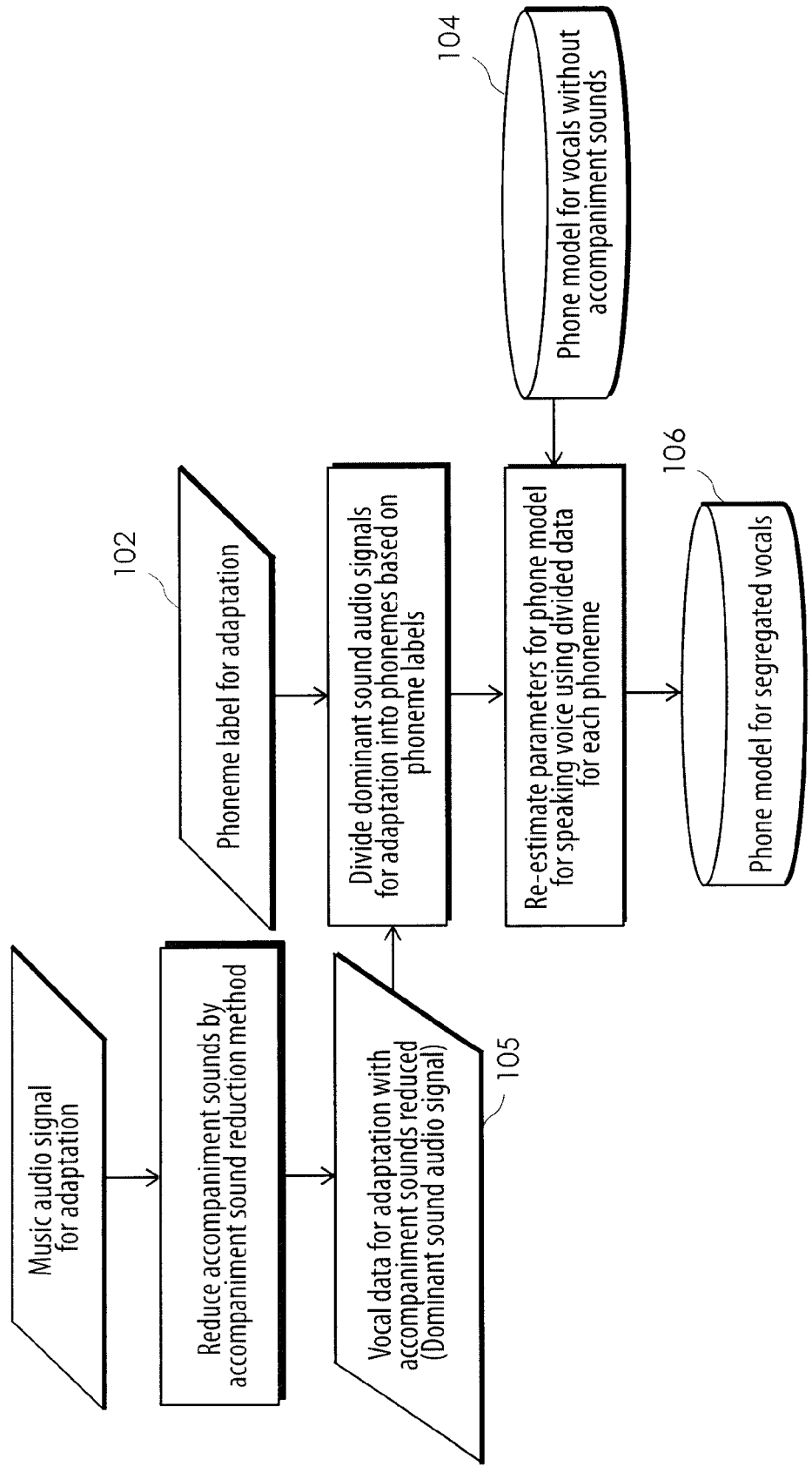
FIG. 21 is a flowchart showing the steps of creating a phone model.

FIG. 21 is a flowchart showing details of the two-step adaptation mentioned above. In the two-step adaptation, dominant sound audio signal 105 of the most dominant sound including vocals, extracted from the music audio signal for adaptation including vocals and accompaniment sounds, are divided into phonemes based on the phoneme label 102 for adaptation. Then, using divided data for each phoneme, parameters of the phone model 104 for vocals without accompaniments are re-estimated so as to recognize vocal phonemes in the dominant sound music audio signal 105, thereby obtaining the phone model 106 for segregated vocals that is used as the phone model 15 for singing voice. The phone model 106 of this type is suitable for vocals with as large accompaniments as the vocals.

Figure 22:
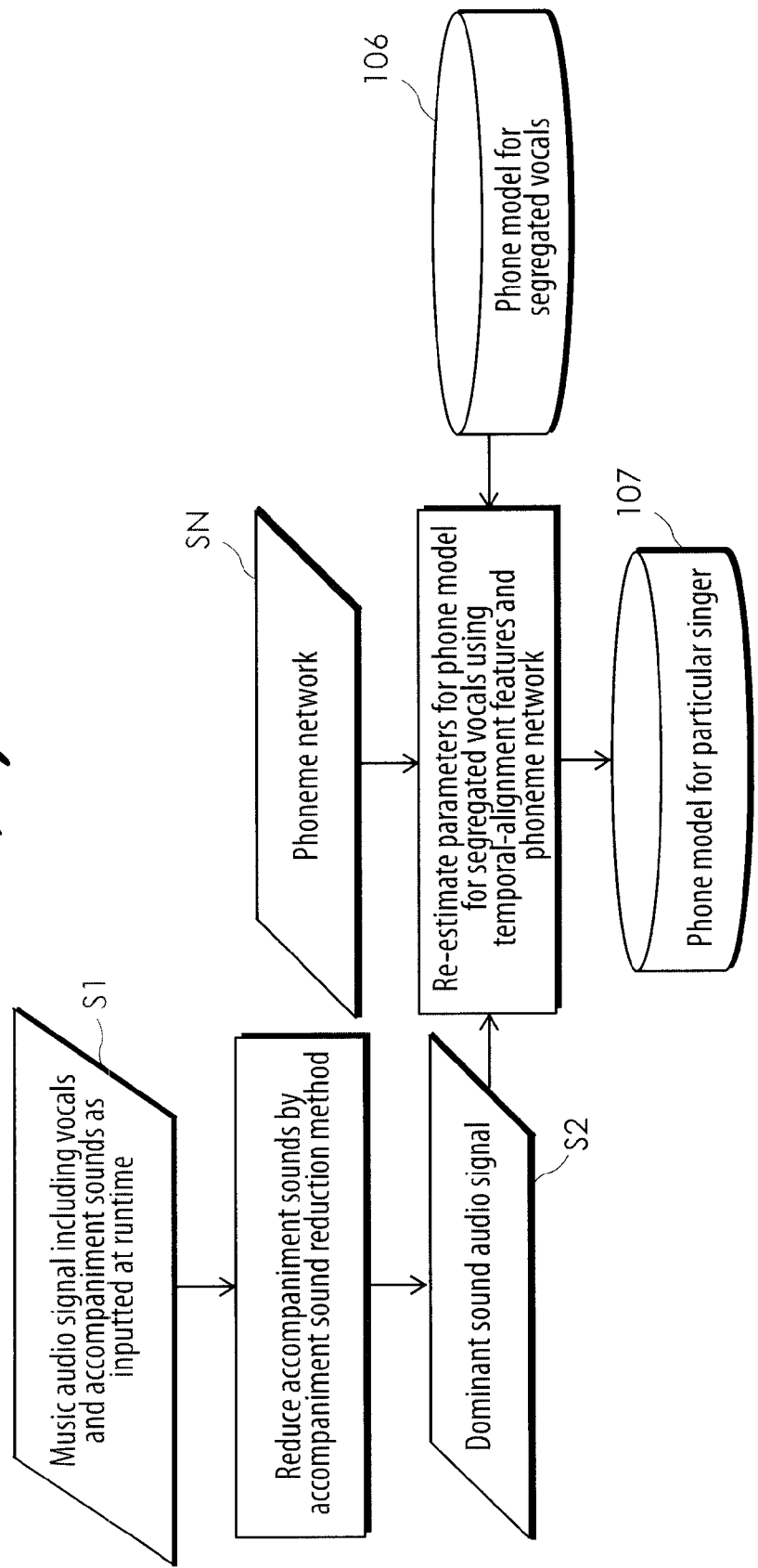
FIG. 22 is a flowchart showing the steps of creating a phone model.

Further, FIG. 22 is a flowchart showing details of the three-step adaptation mentioned above. In the three-step adaptation, the dominant sound audio signal S2 is used. The dominant sound audio signal S2 has been obtained by reducing accompaniment sounds by accompaniment sound reduction method from the music audio signal S1 including vocals and accompaniment sounds inputted at the runtime of the system. Parameters of the phone model 106 for segregated vocals are estimated so as to recognize vocal phonemes of a particular singer singing the music piece of the music audio signal, using the temporal-alignment features extracted by the temporal-alignment feature extracting portion 11 from the dominant sound audio signal S2 including vocals extracted from the music audio signal inputted into the system, and the phoneme network SN corresponding to the inputted music audio signal, thereby obtaining the phone model 107 for a particular singer. The phone model 107 of this type may increase alignment accuracy most of these three phone models since the phone model 107 is directed to a particular singer.

In a music audio signal reproducing apparatus which reproduces a music audio signal while displaying, on a screen, lyrics temporally aligned with the music audio signal to be reproduced, if the system of the present invention is used to display lyrics temporally aligned with the music audio signal, lyrics synchronized with music to be played back may be displayed on the screen.

Next, with reference to FIGS. 1 and 2, a method of automatically performing temporal alignment between music audio signal and lyrics according to the present invention will be described below. First, the dominant sound audio signal extracting portion 5 extracts, from a music audio signal S1 of a musical piece including vocals and accompaniment sounds, a dominant sound audio signal S2 of the most dominant sound including the vocal at each point of time in the step of extracting a dominant sound audio signal. Next, the vocal-section feature extracting portion 7 extracts vocal-section features available to estimate vocal sections which include vocals and non-vocal sections which do not include vocals, from the dominant sound audio signal S2 at each point of time in the step of extracting vocal-section features. Then, the vocal section estimating portion 9 estimates the vocal sections and the non-vocal sections, based on a plurality of the vocal-section features and outputs information on the vocal sections and the non-vocal sections in the step of estimating the vocal section. Next, the temporal-alignment feature extracting portion 11 extracts temporal-alignment features appropriate for temporal alignment between lyrics of the vocal and the music audio signal from the dominant sound audio signal S2 at each point of time in the step of extracting temporal-alignment features. Further, a phoneme network SN is stored in phoneme network storing portion 13 in the step of storing a phoneme network. The phoneme network SN is constituted from a plurality of phonemes corresponding to the music audio signal S1 and temporal intervals between two adjacent phonemes are adjustably connected. Then, the alignment portion 17 is provided with the phone model 15 for singing voice that estimates phonemes corresponding to the temporal-alignment features, based on the temporal-alignment features. The alignment portion 17 performs the temporal alignment between the plurality of phonemes in the phoneme network SN and the dominant sound audio signal S2 in the step of performing temporal alignment. In the step of performing temporal alignment, the temporal-alignment features, the information on the vocal sections and the non-vocal sections, the information on the non-fricative sound sections, and the phoneme network SH are used as inputs. The temporal alignment is performed using the phone model 15 for singing voice on conditions that no phonemes exist at least in the non-vocal sections and that no fricative sound phonemes exist in the non-fricative sound sections.

Generally, vocal detection is evaluated in view of a hit rate and a correct rejection rate. The hit rate refers to a rate at which a section actually including vocals can properly be detected as a vocal section. The correct rejection rate refers to a rate at which a section actually including no vocals can properly be discarded as a non-vocal section. The vocal section estimating portion 9 of this embodiment is configured to control a balance between the hit rate and the correct rejection rate. Why this configuration is required is: there is a trade-off relationship between the hit rate and the correct rejection rate and a proper balance between the two rates depends upon the application. Generally, it is preferable to detect every section that possibly may include vocals by maintaining a relatively high hit rate since the vocal section estimation works as pre-processing for the Viterbi alignment. When identifying singers, it is desirable to detect only the sections which definitely include the vocals by maintaining a high correct rejection rate. None of the existing techniques can control a balance between the hit rate and correct rejection rate.

Figure 23:
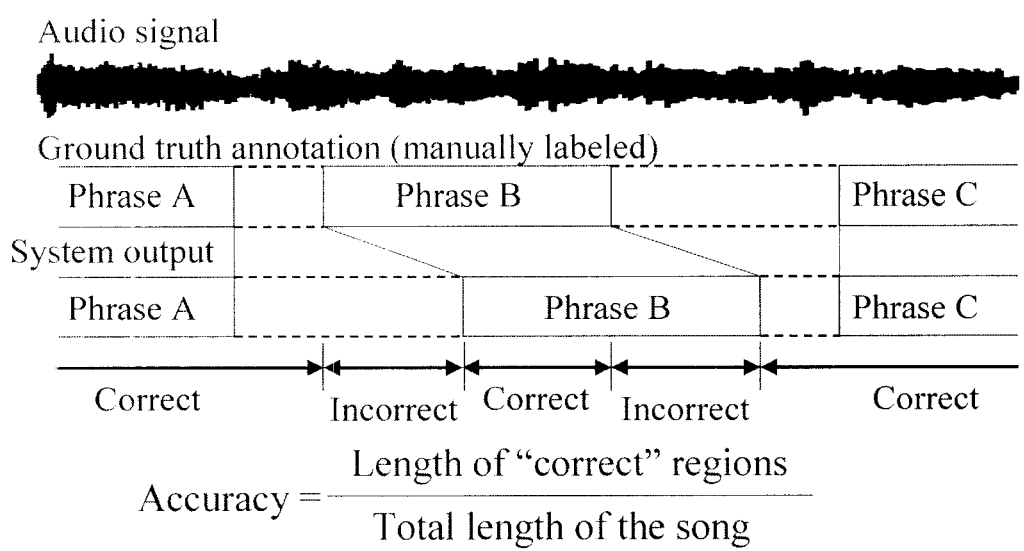
FIG. 23 is an illustration used to explain evaluation criteria.

Now evaluative experiments, which were performed to confirm the effect of using the three kinds of features, namely the first to third features explained before will be described. Ten (10) songs sung by ten (10) singers were selected from the popular music database (RWC-MDB-P-2001) registered in the RWC Music Database. Five-fold cross-validation was conducted using these ten songs as evaluation datasets. Another 19 songs sung by 11 singers were also selected from the RWC Music Database as training datasets for GMM vocal/non-vocal section detection. The evaluation was done for each phrase of the lyrics. The term "phrase" used herein refers to one phrase delimited by a blank or line feed in the text of the original lyrics. As a reference of evaluation, the ratio of the total length of sections, which were correctly labeled at the phrase level, over the entire length of the song or the musical piece was calculated, as shown in FIG. 23.

The experiments were done under the following five conditions:

(i) Comparison: to use a previous system disclosed in Reference 2;

(ii) Detection of fricative sounds: to detect fricative sounds (the third feature of the present invention explained before) in addition to the features used in the previous system;

(iii) Filler model: to employ a filer model (the second feature of the present invention explained before) in addition to the features used in the previous system;

(iv) Novel feature vector: to employ novel features for vocal section detection or vocal activity detection (the first feature of the present invention explained before) in addition to the features used in the previous system; and (v) Method proposed herein (in this embodiment): to use all three features, the first to third features of the present invention in addition to the features used in the previous system.

The results are summarized in a table of FIG. 24. As known from FIG. 24, the average accuracy was increased by 2.0, 3.3, and 3.7 respectively in the techniques, (ii), (iii), and (iv) proposed herein that respectively employed the first, second, and third features. The average accuracy was increased most of all in the embodiment of the present invention, namely in (v) which employed all of the three features, the first to third features of the present invention. The evaluation results indicate that the first feature, or the novel feature vectors for vocal section detection or vocal activity detection, contributed most to improvement of the accuracy. The results of (iii) where the filler model or the second feature was used indicate that the filler model not only absorbed utterances not included in the lyrics but also non-vocal sections that could not removed completely through the vocal section detection. Since the evaluation was done at the phrase level, it could not fully be confirmed how much contribution fricative sound detection made. Judging from the alignment at the phoneme level, however, some examples were found that phoneme misalignment in the middle of a phrase could be reduced.

In the present embodiment, it is difficult to accurately detect fricative sound sections or existence regions of fricative sounds, which include fricative sounds, without fail. However, the present embodiment has attained better performance of the system, focusing on the fact that it is comparatively easy to detect non-fricative sound sections or nonexistence regions of fricative sounds where no fricative sounds exist and incorporating the information on non-fricative sound sections into the system. The filler model also contributed to better performance of the system. The filler model does to allow phonemes in original lyrics to be skipped, but absorbs different utterances not included in the lyrics. The novel vocal features based on the fundamental frequency and the powers of overtones are robust to high-pitched sounds having high fundamental frequency F0 since it is not necessary to estimate spectral envelopes. In the present embodiment, the novel features or feature vectors are used only in the vocal section detection or vocal activity detection. The novel feature vectors may be used as features for forced alignment, provided that a sufficient amount of training data can be provided.

INDUSTRIAL APPLICABILITY

According to the present invention, vocal section detection or vocal activity detection may be done more accurately than ever in connection with high-pitched sounds having high fundamental frequency F0. In the present invention, short pauses located at a boundary between two adjacent phrases in the lyrics are included in a filler which absorbs all the vowel phonemes, and the sequence of phonemes incorporating the fillers is stored as a phoneme network. The filler absorbs utterances not included in the lyrics, for example, singer's shouting, thereby preventing misalignment of lyrics with such utterances. Further, the alignment portion performs the temporal alignment on conditions that no phonemes exist at least in the non-vocal sections. Therefore, a plurality of phonemes in the phoneme network may temporally be aligned with the dominant sound audio signal at each point of time with the effect of the non-vocal sections being eliminated as much as possible. According to the present invention, lyric data tagged with time information may automatically be generated in synchronization with the music audio signals with higher accuracy than ever.

The invention claimed is:

1. A system for automatic temporal alignment between music audio signal and lyrics, comprising a computer, the computer implementing:
   a dominant-sound signal extracting portion configured to extract, from the music audio signal of a musical piece including vocals and accompaniment sounds, a dominant sound audio signal of the most dominant sound including the vocal at each point of time;
   a vocal-section feature extracting portion configured to extract, from the dominant sound audio signal at each point of time, vocal-section features available to estimate vocal sections which include the vocals and non-vocal sections which do not include the vocals;
   a vocal section estimating portion configured to estimate the vocal sections and the non-vocal sections based on the vocal-section features and to output information on the vocal sections and the non-vocal sections;
   a temporal-alignment feature extracting portion configured to extract, from the dominant sound audio signal at each point of time, temporal-alignment features appropriate for temporal alignment between lyrics of the vocal and the music audio signal;
   a phoneme network storing portion configured to store a phoneme network including a plurality of phonemes and a plurality of short pauses in connection with lyrics of the musical piece corresponding to the music audio signal;
   an alignment portion including a phone model for singing voice capable of estimating phonemes corresponding to the temporal-alignment features based on the temporal-alignment features, and configured to perform temporal alignment between phonemes in the phoneme network and the dominant sound audio signals, the alignment portion receiving as inputs the temporal-alignment features outputted from the temporal-alignment feature extracting portion, the information on the vocal sections and the non-vocal sections, and the phoneme network, and performing the temporal alignment on conditions that no phonemes exist at least in the non-vocal sections; and
   a non-fricative section extracting portion configured to extract, from the music audio signal, non-fricative sound sections where no fricative sounds exist, wherein
   the alignment portion further receives information on the non-fricative sound sections as inputs, and performs the temporal alignment on further more conditions that no fricative sound phonemes exist in the non-fricative sound sections.

2. The system for automatic temporal alignment between music audio signal and lyrics according to claim 1, wherein the vocal-section feature extracting portion is configured to extract as the vocal-section features a fundamental frequency F0 of the vocal and normalized h-th order logarithmic powers of overtones obtained by normalizing respective logarithmic values for up to h-th order powers of frequency components of the fundamental frequency F0, h being a positive integer.

3. The system for automatic temporal alignment between music audio signal and lyrics according to claim 1, wherein among the short pauses included in the phoneme network, the short pause located between two phrases included in the lyrics is a filler for absorbing all vowel phonemes.

4. The system for automatic temporal alignment between music audio signal and lyrics according to claim 1, wherein:
   the vocal-section feature extracting portion is configured to extract as the vocal-section features a fundamental frequency F0 of the vocal and normalized h-th order logarithmic powers of overtones obtained by normalizing respective logarithmic values for up to h-th order powers of frequency components of the fundamental frequency F0, h being a positive integer; and
   among the short pauses included in the phoneme network, the short pause located between two phrases included in the lyrics is a filler for absorbing all vowel phonemes.

5. The system for automatic temporal alignment between music audio signal and lyrics according to claim 4, wherein:
   the vocal-section feature extracting portion further extracts a derivative $\Delta F0$ of the fundamental frequency F0 as the vocal-section feature available to estimate the vocal sections and the non-vocal sections.

6. The system for automatic temporal alignment between music audio signal and lyrics according to claim 4, wherein:
   the h-th order overtones are 12th order overtones; and the normalized h-th order logarithmic powers of overtones are normalized 12th order logarithmic powers of overtones.

7. The system for automatic temporal alignment between music audio signal and lyrics according to claim 4, wherein the vocal-section feature extracting portion is configured to:
   extract up to h-th order powers of the frequency components, which are integral multiples of the fundamental frequency F0, from a spectrum of the dominant sound audio signal at each point of time;
   calculate logarithmic values for up to the h-th order powers of the frequency components and define calculated values as h-th order logarithmic powers of overtones; and
   normalize the h-th order logarithmic powers of overtones so that the sum of all the logarithmic powers of overtones may be zero throughout the musical piece and extract normalized results as the normalized h-th order logarithmic powers of overtones.

8. The system for automatic temporal alignment between music audio signal and lyrics according to claim 1, wherein the non-fricative section extracting portion is configured to:
   estimate a bottom envelope from frequency spectrums of the music audio signal at each point of time; and
   extract, as the non-fricative sound sections, sections where a ratio of a total logarithmic power in high frequency bands including frequency components, which are included in the fricative sounds, among available bands of the estimated bottom envelope over a total logarithmic power in the available bands is less than a predetermined value.

9. A method for automatic temporal alignment between music audio signal and lyrics, comprising the steps, which are implemented in a computer, of:
   extracting, from the music audio signal of a musical piece including vocals and accompaniment sounds, a dominant sound audio signal of the most dominant sound including the vocal at each point of time;

extracting, from the dominant sound audio signal at each point of time, vocal- section features available to estimate vocal sections which include the vocals and non-vocal sections which do not include the vocals, wherein the vocal-section features to be extracted are a fundamental frequency F0 of the vocal and normalized h-th order logarithmic powers of overtones obtained by normalizing respective logarithmic values for up to h-th order powers of frequency components of the fundamental frequency F0, h being a positive integer;

estimating the vocal sections and the non-vocal sections based on the vocal-section features and outputting information on the vocal sections and the non-vocal sections;

extracting, from the dominant sound audio signal at each point of time, temporal-alignment features appropriate for temporal alignment between lyrics of the vocal and the music audio signal;

storing in a phoneme network storing portion a phoneme network including a plurality of phonemes and a plurality of short pauses in connection with lyrics of the musical piece corresponding to the music audio signal, wherein among the short pauses included in the phoneme network, the short pause located between two phrases included in the lyrics is a filler for absorbing all vowel phonemes;

performing temporal alignment between phonemes in the phoneme network and the dominant sound audio signals by using a phone model for singing voice capable of estimating phonemes corresponding to the temporal-alignment features based on the temporal-alignment features, on conditions that no phonemes exist at least in the non-vocal sections, wherein the temporal-alignment features, the information on the vocal sections and the non-vocal sections, and the phoneme network are used as inputs; and extracting, from the music audio signal, non-fricative sound sections where no fricative sounds exist, wherein in the step of performing temporal alignment between phonemes in the phoneme network and the dominant sound audio signals, a further condition is established that no fricative sound phonemes exist in the non-fricative sound sections; and information on the non-fricative sound sections is also used as inputs.

10. A computer-readable non-transitory recording medium recorded with a computer program for automatic temporal alignment between music audio signal and lyrics, the computer program causing a computer to execute the steps of:

extracting, from the music audio signal of a musical piece including vocals and accompaniment sounds, a dominant sound audio signal of the most dominant sound including the vocal at each point of time;

extracting, from the dominant sound audio signal at each point of time, vocal-section features available to estimate vocal sections which include the vocals and non-vocal sections which do not include the vocals, wherein the vocal-section features to be extracted are a fundamental frequency F0 of the vocal and normalized h-th order logarithmic powers of overtones obtained by normalizing respective logarithmic values for up to h-th order powers of frequency components of the fundamental frequency F0, h being a positive integer;

extracting, from the music audio signal, non-fricative sound sections where no fricative sounds exist;

estimating the vocal sections and the non-vocal sections based on the vocal-section features and outputting information on the vocal sections and the non-vocal sections;

extracting, from the dominant sound audio signal at each point of time, temporal-alignment features appropriate for temporal alignment between lyrics of the vocals and the music audio signal;

storing in a phoneme network storing portion a phoneme network including a plurality of phonemes and a plurality of short pauses in connection with lyrics of the musical piece corresponding to the music audio signal, wherein among the short pauses included in the phoneme network, the short pause located between two phrases included in the lyrics is a filler for absorbing all vowel phonemes;

performing temporal alignment between phonemes in the phoneme network and the dominant sound audio signals by preparing a phone model for singing voice capable of estimating phonemes corresponding to the temporal-alignment features based on the temporal-alignment features, on conditions that no phonemes exist at least in the non-vocal sections and that no fricative sound phonemes exist in the non-fricative sound sections, wherein the temporal-alignment features, the information on the vocal sections and the non-vocal sections, information on the non-fricative sound sections, and the phoneme network are used as inputs; and extracting, from the music audio signal, non-fricative sound sections where no fricative sounds exist, wherein in the step of performing temporal alignment between phonemes in the phoneme network and the dominant sound audio signals, a further condition is established that no fricative sound phonemes exist in the non-fricative sound sections; and information on the non-fricative sound sections is also used as inputs.

* * * * *